US010413119B2

(12) United States Patent
Alexander

(10) Patent No.: US 10,413,119 B2
(45) Date of Patent: Sep. 17, 2019

(54) HEATED OR COOLED PORTABLE DRINKWARE

(71) Applicant: Ember Technologies, Inc., Westlake Village, CA (US)

(72) Inventor: Clayton Alexander, Westlake Village, CA (US)

(73) Assignee: Ember Technologies, Inc., Westlake village, CA (US)

( * ) Notice: Subject to any disclaimer, the term of this patent is extended or adjusted under 35 U.S.C. 154(b) by 0 days.

(21) Appl. No.: 16/121,000

(22) Filed: Sep. 4, 2018

(65) Prior Publication Data

US 2019/0008317 A1    Jan. 10, 2019

Related U.S. Application Data

(63) Continuation of application No. 15/691,540, filed on Aug. 30, 2017, now Pat. No. 10,098,498, which is a (Continued)

(51) Int. Cl.
*H05B 1/02* (2006.01)
*A47J 36/24* (2006.01)
(Continued)

(52) U.S. Cl.
CPC ...... *A47J 36/2433* (2013.01); *A47G 19/2288* (2013.01); *A61J 9/003* (2013.01);
(Continued)

(58) Field of Classification Search
CPC .. H05B 3/06; H05B 2203/021; H05B 1/0269; H05B 3/0014; A61J 2204/42; A61J 9/003; Y02E 60/145; A47J 36/2433; F28D 20/02
(Continued)

(56) References Cited

U.S. PATENT DOCUMENTS

| 730,337 A | 6/1903 | Bonnefont |
| 1,649,067 A | 11/1927 | Karlson |

(Continued)

FOREIGN PATENT DOCUMENTS

| CH | 631614 | 8/1982 |
| CN | 1338240 A | 3/2002 |

(Continued)

OTHER PUBLICATIONS

Office Action dated Aug. 7, 2018, received for Japanese Patent Application No. JP 2017-151497, 4 pages.
(Continued)

*Primary Examiner* — Mark H Paschall
(74) *Attorney, Agent, or Firm* — Knobbe, Martens, Olson & Bear LLP

(57) ABSTRACT

An actively heated or cooled portable container has a body with a chamber that receives and holds a liquid, and one or more heating or cooling elements in thermal communication with at least a portion of the chamber. An outer surface of the body has one or more electrical contacts. A module is removably coupled to a portion of the body. The module has one or more electrical contacts on an outer surface of the module that contact the one or more electrical contacts on the outer surface of the body, control circuitry, and one or more power storage elements that provide power to the control circuitry and/or the one or more heating or cooling elements. The control circuitry wirelessly communicates with a mobile electronic device to wirelessly transmit information to the mobile electronic device associated with the operation of the module and/or wirelessly receive instructions from a user via the mobile electronic device.

19 Claims, 23 Drawing Sheets

Related U.S. Application Data continuation of application No. 15/050,714, filed on Feb. 23, 2016, now Pat. No. 9,782,036.

(60) Provisional application No. 62/119,973, filed on Feb. 24, 2015.

(51) Int. Cl.
*F28D 20/02* (2006.01)
*H05B 3/00* (2006.01)
*H05B 3/06* (2006.01)
*A47G 19/22* (2006.01)
*H05B 3/82* (2006.01)
*A61J 9/00* (2006.01)

(52) U.S. Cl.
CPC ........... *F28D 20/02* (2013.01); *H05B 1/0269* (2013.01); *H05B 3/0014* (2013.01); *H05B 3/06* (2013.01); *H05B 3/82* (2013.01); *A47G 2200/166* (2013.01); *A61J 2200/42* (2013.01); *H05B 2203/021* (2013.01); *Y02E 60/145* (2013.01)

(58) Field of Classification Search
USPC ....... 219/490, 441, 553, 494, 497, 439, 438, 219/442
See application file for complete search history.

(56) References Cited

U.S. PATENT DOCUMENTS

| | | |
|---|---|---|
| 1,721,311 A | 7/1929 | Muenchen |
| 2,046,125 A | 6/1936 | Lacy |
| 3,064,113 A | 11/1962 | Mani |
| 3,155,260 A | 11/1964 | Widener |
| 3,345,934 A | 10/1967 | Steiner |
| 3,463,140 A | 8/1969 | Rollor |
| 3,603,106 A | 9/1971 | Ryan |
| 3,622,753 A | 11/1971 | Lax |
| 3,676,248 A | 7/1972 | Swartz |
| 3,678,248 A | 7/1972 | Tricault |
| 3,739,148 A | 6/1973 | Ryckman, Jr. |
| 3,766,975 A | 10/1973 | Todd |
| 3,797,563 A | 3/1974 | Hoffmann |
| 3,892,945 A | 7/1975 | Lerner |
| 3,931,494 A | 1/1976 | Fisher |
| 4,068,115 A | 1/1978 | Mack |
| 4,095,090 A | 6/1978 | Pianezza |
| 4,134,004 A | 1/1979 | Anderson |
| 4,240,272 A | 12/1980 | Tiede |
| 4,442,343 A | 4/1984 | Genuit |
| 4,470,999 A | 9/1984 | Carpiac |
| 4,531,046 A | 7/1985 | Stover |
| 4,537,044 A | 8/1985 | Putnam |
| D296,509 S | 7/1988 | Fuke |
| 4,801,782 A | 1/1989 | Ineson |
| 4,827,107 A | 5/1989 | Peery |
| 4,978,833 A | 12/1990 | Knepler |
| 4,980,539 A | 12/1990 | Walton |
| 4,982,722 A | 1/1991 | Wyatt |
| 4,983,798 A | 1/1991 | Eckler |
| 5,042,258 A | 8/1991 | Sundhar |
| 5,090,209 A | 2/1992 | Martin |
| 5,163,290 A | 11/1992 | Kinnear |
| 5,199,275 A | 4/1993 | Martin |
| 5,208,896 A | 5/1993 | Katayev |
| 5,217,064 A | 6/1993 | Kellow |
| 5,243,684 A | 9/1993 | Edwards |
| 5,274,215 A | 12/1993 | Jackson |
| 5,283,420 A | 2/1994 | Montalto |
| 5,313,787 A | 5/1994 | Martin |
| 5,343,368 A | 8/1994 | Miller |
| 5,388,565 A | 2/1995 | Ou |
| 5,448,809 A | 9/1995 | Kraus |
| 5,497,883 A | 3/1996 | Monetti |
| 5,508,494 A | 4/1996 | Sarris |
| 5,508,600 A | 4/1996 | Myslinski |
| 5,549,035 A | 8/1996 | Wing-Chung |
| 5,550,452 A | 8/1996 | Shirai |
| 5,603,220 A | 2/1997 | Seaman |
| 5,603,858 A | 2/1997 | Wyatt |
| 5,643,485 A | 7/1997 | Potter |
| 5,678,925 A | 10/1997 | Garmaise |
| 5,692,627 A | 12/1997 | Feng |
| 5,731,568 A | 3/1998 | Malecek |
| 5,737,923 A | 4/1998 | Gilley |
| 5,771,788 A | 6/1998 | Lee |
| 5,786,643 A | 7/1998 | Wyatt |
| 5,842,353 A | 12/1998 | Kuo-Liang |
| 5,884,006 A | 3/1999 | Frohlich |
| 5,903,133 A | 5/1999 | Amero, Jr. |
| 5,948,301 A | 9/1999 | Liebermann |
| 5,954,984 A | 9/1999 | Ablah |
| 5,959,433 A | 9/1999 | Rohde |
| 6,000,224 A | 12/1999 | Foye |
| 6,005,233 A | 12/1999 | Wyatt |
| 6,013,901 A | 1/2000 | Lavoie |
| 6,020,575 A | 2/2000 | Nagle et al. |
| 6,032,481 A | 3/2000 | Mosby |
| 6,042,720 A | 3/2000 | Reber |
| 6,072,161 A | 6/2000 | Stein |
| 6,075,229 A | 6/2000 | Vanselow |
| 6,089,409 A | 7/2000 | Hart |
| 6,108,489 A | 8/2000 | Frohlich |
| 6,110,159 A | 8/2000 | Tsujita |
| 6,123,065 A | 9/2000 | Teglbjarg |
| 6,140,614 A | 10/2000 | Padamsee |
| 6,141,975 A | 11/2000 | Tatsumi |
| 6,144,016 A | 11/2000 | Garvin |
| 6,158,227 A | 12/2000 | Seeley |
| 6,180,003 B1 | 1/2001 | Reber |
| 6,212,959 B1 | 4/2001 | Perkins |
| 6,232,585 B1 | 5/2001 | Clothier |
| RE37,213 E | 6/2001 | Staggs |
| 6,274,856 B1 | 8/2001 | Clothier |
| 6,279,470 B2 | 8/2001 | Simeray |
| 6,281,611 B1 | 8/2001 | Chen |
| 6,314,867 B1 | 11/2001 | Russell |
| 6,316,753 B2 | 11/2001 | Clothier |
| 6,320,169 B1 | 11/2001 | Clothier |
| 6,350,972 B1 | 2/2002 | Wright |
| 6,353,208 B1 | 3/2002 | Bostic |
| 6,376,803 B1 | 4/2002 | Klinger |
| 6,384,387 B1 | 5/2002 | Owens |
| 6,403,928 B1 | 6/2002 | Ford |
| 6,414,278 B1 | 7/2002 | Frohlich |
| 6,415,624 B1 | 7/2002 | Connors |
| 6,417,498 B1 | 7/2002 | Shields et al. |
| 6,427,863 B1 | 8/2002 | Nichols |
| 6,433,313 B1 | 8/2002 | Owens |
| 6,444,961 B2 | 9/2002 | Clothier |
| 6,543,335 B1 | 4/2003 | Lassota |
| 6,555,789 B2 | 4/2003 | Owens |
| 6,571,564 B2 | 6/2003 | Upadhye |
| 6,584,374 B2 | 6/2003 | Lee |
| 6,634,417 B1 | 10/2003 | Kolowich |
| 6,651,445 B1 | 11/2003 | Clark |
| 6,657,170 B2 | 12/2003 | Clothier |
| 6,662,978 B2 | 12/2003 | Lin |
| 6,664,520 B2 | 12/2003 | Clothier |
| 6,674,052 B1 | 1/2004 | Luo |
| 6,702,138 B1 | 3/2004 | Bielecki |
| 6,703,590 B1 | 3/2004 | Holley, Jr. |
| 6,818,867 B2 | 11/2004 | Kressmann |
| 6,852,954 B1 | 2/2005 | Liu |
| 6,864,462 B2 | 3/2005 | Sanoner |
| 6,870,135 B2 | 3/2005 | Hamm |
| 6,921,880 B2 | 7/2005 | Berger |
| 6,953,913 B1 | 10/2005 | Hara |
| 6,968,888 B2 | 11/2005 | Kolowich |
| 7,002,111 B2 | 2/2006 | Bauer |
| 7,022,946 B2 | 4/2006 | Sanoner |
| 7,034,256 B1 | 4/2006 | Phillips |

(56) References Cited

U.S. PATENT DOCUMENTS

| | | |
|---|---|---|
| 7,059,387 B2 | 6/2006 | Kolowich |
| 7,073,678 B1 | 7/2006 | Dibdin |
| 7,091,455 B2 | 8/2006 | Fung |
| 7,109,445 B2 | 9/2006 | Patterson |
| 7,174,720 B2 | 2/2007 | Kennedy |
| 7,193,190 B2 | 3/2007 | Kissel, Jr. |
| 7,208,707 B2 | 4/2007 | Clothier |
| 7,212,955 B2 | 5/2007 | Kirshenbaum |
| 7,227,108 B2 | 6/2007 | Clothier |
| 7,263,283 B2 | 8/2007 | Knepler |
| 7,276,676 B1 | 10/2007 | Thompson |
| 7,287,386 B2 | 10/2007 | Upadhye |
| 7,287,656 B2 | 10/2007 | Guilford, III |
| 7,414,380 B2 | 8/2008 | Tang |
| 7,419,073 B2 | 9/2008 | Crisp, III |
| 7,431,174 B2 | 10/2008 | Thissen |
| 7,571,830 B2 | 8/2009 | Lin |
| 7,592,084 B2 | 9/2009 | Hoffjann |
| 7,659,493 B2 | 2/2010 | Reusche |
| 7,681,754 B1 | 3/2010 | Ross |
| 7,683,572 B2 | 3/2010 | Toya |
| 7,748,223 B2 | 7/2010 | Minoura |
| 7,815,067 B2 | 10/2010 | Matsumoto |
| 7,825,353 B2 | 11/2010 | Shingler |
| 7,836,722 B2 | 11/2010 | Magill |
| 7,861,538 B2 | 1/2011 | Welle |
| 7,872,214 B2 | 1/2011 | Schandel |
| 7,886,655 B1 | 2/2011 | Lassota |
| 7,934,537 B2 | 5/2011 | Kolowich |
| 7,942,145 B2 | 5/2011 | Palena |
| 7,948,209 B2 | 5/2011 | Jung |
| 7,966,927 B2 | 6/2011 | Yoakim |
| 7,997,786 B2 | 8/2011 | Liu |
| 8,055,310 B2 | 11/2011 | Beart |
| 8,061,149 B1 | 11/2011 | Gowans |
| 8,076,620 B2 | 12/2011 | Maupin |
| 8,146,485 B2 | 4/2012 | Ozanne |
| 8,205,468 B2 | 6/2012 | Hemminger |
| 8,272,532 B2 | 9/2012 | Michaelian |
| 8,274,016 B2 | 9/2012 | Montana |
| 8,280,453 B2 | 10/2012 | Beart |
| 8,319,154 B2 | 11/2012 | Shaikh |
| 8,336,729 B2 | 12/2012 | Kelly |
| 8,400,104 B2 | 3/2013 | Adamczyk |
| 8,448,809 B2 | 5/2013 | Kelly |
| 8,467,669 B2 | 6/2013 | Widanagamage |
| 8,479,941 B2 | 7/2013 | Matsumoto |
| 8,618,448 B2 | 12/2013 | Alexander |
| 8,621,980 B2 | 1/2014 | Bunn |
| 8,759,721 B1 | 6/2014 | Alexander |
| 8,907,796 B2 | 12/2014 | Sweeney |
| 9,035,222 B2 | 5/2015 | Alexander |
| 9,138,097 B2 | 9/2015 | Driel et al. |
| 9,151,545 B2 | 10/2015 | Soukhojak |
| 9,184,427 B2 | 11/2015 | Chuang |
| 9,265,371 B2 | 2/2016 | Glucksman et al. |
| 9,351,600 B2 | 5/2016 | Rime |
| 9,480,363 B2 | 11/2016 | Delattre |
| 9,648,970 B2 | 5/2017 | Lee |
| 9,814,331 B2 | 11/2017 | Alexander |
| 9,839,324 B2 | 12/2017 | Xiao et al. |
| 9,863,695 B2 | 1/2018 | Alexander et al. |
| 9,967,924 B2 | 5/2018 | Heczko |
| 10,182,674 B2 | 1/2019 | Alexander et al. |
| 2001/0009609 A1 | 7/2001 | Bradenbaugh |
| 2001/0022304 A1 | 9/2001 | Roche |
| 2001/0023866 A1 | 9/2001 | Wang |
| 2002/0023912 A1 | 2/2002 | McGee |
| 2002/0083840 A1 | 7/2002 | Lassota |
| 2002/0104318 A1 | 8/2002 | Jaafar |
| 2002/0129712 A1 | 9/2002 | Westbrook |
| 2002/0162339 A1 | 11/2002 | Harrison |
| 2002/0175158 A1 | 11/2002 | Sanoner et al. |
| 2003/0024250 A1 | 2/2003 | Haas |
| 2003/0029662 A1 | 2/2003 | Piech |
| 2003/0029862 A1 | 2/2003 | Clothier |
| 2003/0066638 A1 | 4/2003 | Qu |
| 2003/0074903 A1 | 4/2003 | Upadhye |
| 2003/0145621 A1 | 8/2003 | Kidwell |
| 2004/0004072 A1 | 1/2004 | Clothier |
| 2004/0006996 A1 | 1/2004 | Butcher |
| 2004/0159240 A1 | 8/2004 | Lyall, III |
| 2004/0167592 A1 | 8/2004 | Grove |
| 2004/0194470 A1 | 10/2004 | Upadhye |
| 2005/0045615 A1 | 3/2005 | Sanoner |
| 2005/0121431 A1 | 6/2005 | Yuen |
| 2005/0242804 A1 | 11/2005 | Hintz |
| 2006/0021513 A1 | 2/2006 | Ide |
| 2006/0023480 A1 | 2/2006 | Plummer |
| 2006/0081599 A1 | 4/2006 | Anderson |
| 2006/0173259 A1 | 8/2006 | Flaherty |
| 2006/0207442 A1 | 9/2006 | Pettersson |
| 2006/0209628 A1 | 9/2006 | Jones |
| 2006/0231109 A1 | 10/2006 | Howell |
| 2006/0261233 A1 | 11/2006 | Williams et al. |
| 2007/0092773 A1 | 4/2007 | Guo |
| 2007/0151457 A1 | 7/2007 | Rabin |
| 2007/0182367 A1 | 8/2007 | Partovi |
| 2007/0223895 A1 | 9/2007 | Flemm |
| 2007/0278207 A1 | 12/2007 | Van Hoy |
| 2007/0279002 A1 | 12/2007 | Partovi |
| 2008/0011077 A1 | 1/2008 | Ramus |
| 2008/0019122 A1 | 1/2008 | Kramer |
| 2008/0022695 A1 | 1/2008 | Welle |
| 2008/0022696 A1 | 1/2008 | Welle |
| 2008/0041233 A1 | 2/2008 | Bunn |
| 2008/0041859 A1 | 2/2008 | Teglbjarg |
| 2008/0087270 A1 | 4/2008 | Shaikh |
| 2008/0121630 A1 | 5/2008 | Simard |
| 2008/0135564 A1 | 6/2008 | Romero |
| 2008/0141681 A1 | 6/2008 | Arnold |
| 2008/0149624 A1 | 6/2008 | Tamura |
| 2008/0179311 A1 | 7/2008 | Koro |
| 2008/0213449 A1 | 9/2008 | Wisner |
| 2008/0251063 A1 | 10/2008 | Palena et al. |
| 2008/0272134 A1 | 11/2008 | Rohe |
| 2009/0049845 A1 | 2/2009 | Mcstravick |
| 2009/0058352 A1 | 3/2009 | Lin |
| 2009/0064687 A1 | 3/2009 | Tuszkiewicz |
| 2009/0071952 A1 | 3/2009 | Kuwabara |
| 2009/0102296 A1 | 4/2009 | Greene |
| 2009/0166350 A1 | 7/2009 | Ho |
| 2009/0184102 A1 | 7/2009 | Parker, Jr. |
| 2009/0230117 A1 | 9/2009 | Fernando |
| 2010/0000980 A1 | 1/2010 | Popescu |
| 2010/0028758 A1 | 2/2010 | Eaves |
| 2010/0089247 A1 | 4/2010 | Yang |
| 2010/0108694 A1 | 5/2010 | Sedlbauer |
| 2010/0125417 A1 | 5/2010 | Hyde |
| 2010/0147014 A1 | 6/2010 | Kim |
| 2010/0158489 A1 | 6/2010 | Siu |
| 2010/0158660 A1 | 6/2010 | Radhakrishnan |
| 2010/0186499 A1 | 7/2010 | Ramus et al. |
| 2010/0251755 A1 | 10/2010 | Lauchnor |
| 2011/0056215 A1 | 3/2011 | Ham |
| 2011/0062149 A1 | 3/2011 | Oriel |
| 2011/0072978 A1 | 3/2011 | Popescu |
| 2011/0108506 A1 | 5/2011 | Lindhorst-Ko |
| 2011/0121660 A1 | 5/2011 | Azancot |
| 2011/0143000 A1 | 6/2011 | Fiset |
| 2011/0152979 A1 | 6/2011 | Driscoll |
| 2011/0155621 A1 | 6/2011 | Lindquist |
| 2011/0174993 A1 | 7/2011 | Blain |
| 2011/0179807 A1 | 7/2011 | Holloway |
| 2011/0180527 A1 | 7/2011 | Abbott |
| 2011/0198255 A1 | 8/2011 | Baumfalk |
| 2011/0259871 A1 | 10/2011 | Li |
| 2011/0265562 A1 | 11/2011 | Li |
| 2012/0061050 A1 | 3/2012 | Petrillo |
| 2012/0064470 A1 | 3/2012 | Delattre |
| 2012/0082766 A1 | 4/2012 | Maupin |
| 2012/0090333 A1 | 4/2012 | Deliamorte, Jr. |
| 2012/0103562 A1 | 5/2012 | Alexander |
| 2012/0118874 A1 | 5/2012 | Williams |

(56) References Cited

U.S. PATENT DOCUMENTS

| | | |
|---|---|---|
| 2012/0132646 A1 | 5/2012 | England |
| 2012/0138597 A1 | 6/2012 | Quella |
| 2012/0187066 A1 | 7/2012 | Redl |
| 2012/0193999 A1 | 8/2012 | Zeine |
| 2012/0235505 A1 | 9/2012 | Schatz |
| 2012/0235636 A1 | 9/2012 | Partovi |
| 2012/0248096 A1 | 10/2012 | Lee |
| 2012/0255946 A1 | 10/2012 | Kim |
| 2012/0256585 A1 | 10/2012 | Partovi |
| 2012/0258229 A1 | 10/2012 | Mindrup |
| 2012/0312031 A1 | 12/2012 | Olsen |
| 2012/0319500 A1 | 12/2012 | Beart |
| 2013/0016462 A1 | 1/2013 | Howitt |
| 2013/0059259 A1 | 3/2013 | Oldani |
| 2013/0103463 A1 | 4/2013 | Briar |
| 2013/0167730 A1 | 7/2013 | Behm |
| 2013/0200064 A1 | 8/2013 | Alexander |
| 2013/0206015 A1 | 8/2013 | Jacoby |
| 2013/0221013 A1 | 8/2013 | Kolowich |
| 2013/0239607 A1 | 9/2013 | Kelly |
| 2013/0247591 A1 | 9/2013 | Demasi |
| 2013/0255824 A1 | 10/2013 | Williams et al. |
| 2013/0275075 A1 | 10/2013 | Johnson |
| 2014/0165607 A1 | 6/2014 | Alexander |
| 2014/0230484 A1 | 8/2014 | Yavitz |
| 2014/0238985 A1 | 8/2014 | Sweeney |
| 2015/0024349 A1 | 1/2015 | Bischoff |
| 2015/0122688 A1 | 5/2015 | Dias |
| 2015/0245723 A1 | 9/2015 | Alexander |
| 2015/0335184 A1 | 11/2015 | Balachandran |
| 2016/0183730 A1 | 6/2016 | Bedi |
| 2017/0150840 A1 | 6/2017 | Park |

FOREIGN PATENT DOCUMENTS

| | | |
|---|---|---|
| CN | 1502513 A | 6/2004 |
| CN | 2684824 | 3/2005 |
| CN | 2708795 Y | 7/2005 |
| CN | 1748112 A | 3/2006 |
| CN | 1776992 A | 5/2006 |
| CN | 2922666 Y | 7/2007 |
| CN | 101069606 A | 11/2007 |
| CN | 200980833 | 11/2007 |
| CN | 101109795 A | 1/2008 |
| CN | 201042350 Y | 4/2008 |
| CN | 201076180 | 6/2008 |
| CN | 201308643 | 10/2008 |
| CN | 201171801 | 12/2008 |
| CN | 201237271 | 5/2009 |
| CN | 101507261 A | 8/2009 |
| CN | 201303850 Y | 9/2009 |
| CN | 201445353 U | 5/2010 |
| CN | 101721314 | 6/2010 |
| CN | 101820128 A | 9/2010 |
| CN | 201612420 U | 10/2010 |
| CN | 201668739 | 12/2010 |
| CN | 202168958 | 3/2012 |
| CN | 102802294 | 5/2012 |
| CN | 202681700 | 1/2013 |
| CN | 202682376 | 1/2013 |
| CN | 101052368 B | 4/2013 |
| CN | 202919767 U | 5/2013 |
| CN | 203123058 | 8/2013 |
| CN | 102266184 B | 10/2013 |
| CN | 101945599 B | 3/2014 |
| CN | 203468187 U | 3/2014 |
| CN | 103784326 | 5/2014 |
| CN | 102512085 B | 6/2014 |
| CN | 203777334 U | 8/2014 |
| CN | 203874128 U | 10/2014 |
| CN | 203915518 | 11/2014 |
| CN | 203989073 U | 12/2014 |
| CN | 104473771 | 4/2015 |
| CN | 204261058 U | 4/2015 |
| CN | 204352215 U | 5/2015 |
| CN | 204428452 U | 7/2015 |
| CN | 204483720 U | 7/2015 |
| CN | 204501704 U | 7/2015 |
| CN | 103622425 B | 9/2015 |
| CN | 204709427 U | 10/2015 |
| CN | 204766593 U | 11/2015 |
| CN | 204862692 U | 12/2015 |
| CN | 103989380 B | 1/2016 |
| CN | 204931161 U | 1/2016 |
| CN | 204931162 U | 1/2016 |
| CN | 204950604 U | 1/2016 |
| CN | 204972308 U | 1/2016 |
| CN | 205054911 U | 3/2016 |
| CN | 205163676 U | 4/2016 |
| CN | 205459941 U | 8/2016 |
| CN | 205698560 U | 11/2016 |
| CN | 205849824 U | 1/2017 |
| CN | 205849825 U | 1/2017 |
| CN | 205948058 U | 2/2017 |
| CN | 205948059 U | 2/2017 |
| CN | 205994186 U | 3/2017 |
| CN | 206006757 U | 3/2017 |
| CN | 206026710 U | 3/2017 |
| CN | 206044395 U | 3/2017 |
| CN | 206045000 U | 3/2017 |
| CN | 206063431 U | 4/2017 |
| CN | 206102985 U | 4/2017 |
| CN | 206102987 U | 4/2017 |
| CN | 206120763 U | 4/2017 |
| CN | 206167409 U | 5/2017 |
| CN | 206198317 U | 5/2017 |
| CN | 206213740 U | 6/2017 |
| CN | 206252255 U | 6/2017 |
| CN | 206285271 U | 6/2017 |
| CN | 206295458 U | 7/2017 |
| CN | 206355335 U | 7/2017 |
| CN | 206391214 U | 8/2017 |
| CN | 206414170 U | 8/2017 |
| CN | 206424319 U | 8/2017 |
| CN | 206508264 U | 9/2017 |
| CN | 206630471 U | 11/2017 |
| CN | 206642098 U | 11/2017 |
| CN | 206657256 U | 11/2017 |
| CN | 206660148 U | 11/2017 |
| CN | 206687924 U | 12/2017 |
| CN | 206729506 U | 12/2017 |
| CN | 206730162 U | 12/2017 |
| CN | 104958185 B | 1/2018 |
| CN | 105231819 B | 1/2018 |
| CN | 206896527 U | 1/2018 |
| CN | 206934346 U | 1/2018 |
| CN | 206934347 U | 1/2018 |
| CN | 207041678 U | 2/2018 |
| CN | 207137055 U | 3/2018 |
| CN | 207137057 U | 3/2018 |
| CN | 207221113 U | 4/2018 |
| CN | 106419508 B | 5/2018 |
| CN | 207306902 U | 5/2018 |
| CN | 207445226 U | 6/2018 |
| CN | 207506787 U | 6/2018 |
| CN | 106361167 B | 8/2018 |
| CN | 207755561 U | 8/2018 |
| CN | 207821691 U | 9/2018 |
| CN | 207821692 U | 9/2018 |
| CN | 207821693 U | 9/2018 |
| CN | 207855570 U | 9/2018 |
| CN | 105395078 B | 10/2018 |
| CN | 207996308 U | 10/2018 |
| CN | 208030985 U | 11/2018 |
| CN | 208048624 U | 11/2018 |
| CN | 105943402 B | 12/2018 |
| CN | 208211918 U | 12/2018 |
| CN | 105640315 B | 1/2019 |
| CN | 208448168 U | 2/2019 |
| CN | 208461536 U | 2/2019 |
| CN | 208463661 U | 2/2019 |
| CN | 208481024 U | 2/2019 |
| CN | 208481124 U | 2/2019 |
| CN | 208491583 U | 2/2019 |

(56) References Cited

FOREIGN PATENT DOCUMENTS

| | | |
|---|---|---|
| DE | 19744526 | 4/1999 |
| DE | 20108363 | 8/2001 |
| DE | 20314416 | 1/2004 |
| DE | 202016007747 U1 | 3/2017 |
| EP | 0332355 | 9/1989 |
| EP | 0722708 | 7/1996 |
| EP | 0895772 | 2/1999 |
| EP | 1338230 B1 | 5/2006 |
| EP | 1722661 B1 | 1/2008 |
| EP | 2165243 A1 | 3/2010 |
| EP | 2001761 | 1/2012 |
| EP | 2288278 B1 | 4/2012 |
| EP | 2308771 | 6/2012 |
| EP | 2498653 B1 | 1/2015 |
| EP | 3159212 B1 | 4/2017 |
| EP | 3267861 B1 | 1/2018 |
| FR | 2 705 764 | 12/1994 |
| FR | 2737380 | 1/1997 |
| FR | 2752377 | 2/1998 |
| FR | 2763463 | 11/1998 |
| FR | 2828082 | 2/2003 |
| GB | 2 390 798 A | 1/2004 |
| GB | 2414922 A | 12/2005 |
| GB | 2439270 | 8/2006 |
| GB | 2441825 | 3/2008 |
| GB | 2498338 B2 | 2/2017 |
| GB | 2541080 B2 | 4/2018 |
| IN | 02555CN2012 A | 5/2013 |
| IN | 03553MU2012 A | 6/2015 |
| IN | 201744034469 A | 4/2018 |
| JP | U-S54-147575 | 4/1953 |
| JP | S63-249519 A | 10/1988 |
| JP | 06-021549 U | 3/1994 |
| JP | H10-146276 U | 6/1998 |
| JP | 11-268777 | 10/1999 |
| JP | 2000-279302 A | 10/2000 |
| JP | 2003-299255 A | 10/2003 |
| JP | A-2004-261493 | 9/2004 |
| JP | 2006-068152 | 3/2006 |
| JP | 2006-102234 A | 4/2006 |
| JP | 2006-166522 A | 6/2006 |
| JP | 2006-345957 | 12/2006 |
| JP | 2007-064557 A | 3/2007 |
| JP | 2007-312932 A | 12/2007 |
| JP | 2008-173464 A | 7/2008 |
| JP | U-3153007 | 7/2009 |
| JP | 2010-527226 A | 8/2010 |
| JP | 2011-171205 | 9/2011 |
| JP | 5127819 | 1/2013 |
| JP | 5481388 | 4/2014 |
| JP | 5742514 B2 | 7/2015 |
| JP | 6223501 B2 | 11/2017 |
| KR | 2011 0080453 | 7/2011 |
| WO | WO 2004/055654 A2 | 7/2004 |
| WO | WO 2008/028329 | 3/2008 |
| WO | WO 2008/065175 | 6/2008 |
| WO | WO 2008/137996 A1 | 11/2008 |
| WO | WO 2008/155538 A2 | 12/2008 |
| WO | WO 2009/138930 A1 | 11/2009 |
| WO | WO 2010/087560 A2 | 8/2010 |
| WO | WO 2010/087560 A3 | 8/2010 |
| WO | WO 2012/104665 | 8/2012 |
| WO | WO 2013 182520 A2 | 12/2013 |
| WO | WO 2013 187763 A1 | 12/2013 |
| WO | WO 2014 138771 A1 | 9/2014 |

OTHER PUBLICATIONS

Decision of Rejection dated Apr. 4, 2017 in JP Application No. 2013-537797.
European Office Action dated Sep. 28, 2017, received in European Patent Application No. 14 774 350.4, pp. 5.
European Patent Office Search Report dated Mar. 17, 2016 regarding Application No. 11838764.6-1804, PCT/US2011059014, 7 pages.
European Search Report received in European Patent Application No. 15811173.2, dated Dec. 13, 2017.
First Office Action dated Nov. 23, 2016 in CN Application No. 201480014620.9.
International Preliminary Report on Patentability dated May 7, 2013 in PCT Application No. PCT/US2011/059014.
International Search Report and Written Opinion dated Jul. 2015, Application No. PCT/US15/36304, 18 pages.
International Search Report and Written Opinion dated Jan. 12, 2016 in PCT Application No. PCT/US15/36304.
International Search Report and Written Opinion dated Dec. 9, 2014 in PCT/US2014/019130.
International Search Report and Written Opinion dated Mar. 16, 2012 in PCT/US2011/059014.
Non-final office action dated Aug. 2, 2016 in Japanese Patent Application No. 2013-537797.
Notice of Reason(s) for Rejection dated Aug. 11, 2015 in JP Application No. 2013-53797.
Office Action dated Jan. 12, 2018, received in Chinese Application No. 201510869257.5.
Office Action in related Chinese Application No. 201180063844.5, dated Dec. 29, 2014.
Office Action received in Japanese Patent Application No. 2017-151497, dated Nov. 21, 2017, 5 pages.
Patent Examination Report No. 1 in related Australian Application No. 2011323416, dated May 15, 2015.
Patent Examination Report No. 2 in related Australian Application No. 2011323416, dated Oct. 20, 2015.
Second Office Action dated Apr. 10, 2017 in CN Application No. 201510869257.5.
Supplementary European Search Report dated Oct. 18, 2016 in European Patent Application No. 14774350.
Chinese Office Action, regarding Application No. 201510869257.5, dated Aug. 30, 2018, 9 pages.
Australian Examination Report regarding Application No. 2016216669, dated Feb. 14, 2019, four pages.

HEATED OR COOLED PORTABLE DRINKWARE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is related to U.S. application Ser. No. 14/712813, filed May 14, 2015, the entire contents of which are hereby incorporated by reference and should be considered a part of this specification.

BACKGROUND

Field

The invention is directed to containers, such as cups, mugs, travel mugs, baby bottles beer mugs, carafes or liquid containers, and more particularly to actively heated or cooled drinkware.

Description of the Related Art

Drinkware (e.g., cups, mugs, travel mugs, liquid containers, baby bottles, drinking bottles) are sometimes made of ceramic materials or plastic materials (and can sometimes be made of metal) for holding liquids therein. However, one common drawback of existing drinkware is their inability to adjust the temperature of the liquid for consumption. For example, sometimes the liquid that is poured into the drinkware (e.g., coffee, tea, milk, soup) is too hot to drink so that the user must wait a while before trying to consume the liquid or risk burning their mouth if they consume the liquid too soon. However, if the user waits too long to consume the liquid, it may cool down too much so that it is unsatisfying to consume. Additionally, if the user is travelling (e.g., commuting to work) over a long distance, the liquid will continue to cool down so that the user cannot enjoy the liquid in the drinkware throughout their travels as the liquid contents will not remain warm throughout the trip.

SUMMARY

Accordingly, there is a need for improved containers (e.g., drinkware) that can cool down the contents (e.g., soup, oatmeal coffee, tea, etc.) poured therein to a temperature suitable to consumption, and that can maintain the contents at a temperature suitable for consumption over an extended period of time that is longer than that available with conventional containers (e.g., drinkware).

In accordance with one aspect, an actively heated or cooled portable container is provided. The container comprises a portable body having a receiving portion defined by an inner sidewall and inner bottom wall for receiving and holding a liquid, and a heating and cooling system housed in the portable body. The heating and cooling system comprises a cooling element comprising a phase change material disposed in a chamber that surrounds at least a portion of the inner sidewall so that the phase change material is in thermal communication with at least a portion of the inner sidewall of the portable body, the phase change material configured to transition from one phase to a second phase at a predetermined temperature. The heating and cooling system also comprises a heating element in thermal communication with at least a portion of the inner sidewall or inner bottom wall of the portable body. The heating and cooling system also comprises control circuitry disposed in a portion of the portable body, the control circuitry configured to control the operation of the heating element. The heating and cooling system also comprises one or more power storage elements disposed in another portion of the portable body and configured to provide electrical energy to one or both of the heating element and control circuitry. The cooling element removes heat from a liquid disposed in the receiving portion that has a temperature above the predetermined temperature to lower the temperature of the liquid toward the predetermined temperature, and the control circuitry controls the heating element to add heat to the liquid in the receiving portion to maintain the temperature of the liquid at said predetermined temperature or increase the temperature of the liquid above said predetermined temperature.

In accordance with another aspect, an actively heated or cooled portable container is provided. The container comprises a portable body having a receiving portion defined by an inner sidewall and inner bottom wall for receiving and holding a liquid, and a heating and cooling system housed in the portable body. The heating and cooling system comprises means for passively cooling at least a portion of the inner sidewall of the portable body to remove heat from a liquid in the receiving portion of the portable body, a heating element in thermal communication with at least a portion of the inner sidewall or inner bottom wall of the portable body, control circuitry disposed in a portion of the portable body, the control circuitry configured to control the operation of the heating element, and one or more power storage elements disposed in another portion of the portable body and configured to provide electrical energy to one or both of the heating element and control circuitry. The control circuitry controls the heating element to add heat to the liquid in the receiving portion to maintain the temperature of the liquid at a predetermined temperature or increase the temperature of the liquid above said predetermined temperature.

In accordance with another aspect, an actively heated or cooled portable container is provided. The container comprises a portable body having a receiving portion defined by an inner sidewall and inner bottom wall for receiving and holding a liquid and an outer sidewall radially spaced apart from the inner sidewall to define an annular chamber therebetween. The container also comprises a heating and cooling system housed in the portable body, comprising a cooling element comprising a heat sink disposed in the annular chamber that is in thermal communication with at least a portion of the inner sidewall of the portable body, a heating element in thermal communication with at least a portion of the inner sidewall or inner bottom wall of the portable body, control circuitry disposed in a portion of the portable body, the control circuitry configured to control the operation of the heating element, and one or more power storage elements disposed in another portion of the portable body and configured to provide electrical energy to one or both of the heating element and control circuitry. The cooling element removes heat from a liquid disposed in the receiving portion, and wherein the control circuitry controls the heating element to add heat to the liquid in the receiving portion to maintain the temperature of the liquid at a predetermined temperature or increase the temperature of the liquid above said predetermined temperature.

In accordance with another aspect, an actively heated container is provided, comprising a portable body having a receiving portion defined by an inner sidewall and inner bottom wall for receiving and holding a liquid and an outer sidewall radially spaced apart from the inner sidewall to define an annular chamber therebetween. The container also comprises an active heating system, comprising one or more heating elements in thermal communication with at least a portion of the inner sidewall or inner bottom wall of the portable body, control circuitry disposed in a portion of the portable body, the control circuitry configured to control the operation of the one or more heating elements, and one or more power storage elements disposed in another portion of the portable body and configured to provide electrical energy to one or both of the control circuitry and the one or more heating elements. The control circuitry is configured to calculate a volume of the liquid in the receiving portion of the portable body based on sensed information indicative of a temperature of the liquid in the receiving portion.

In accordance with another aspect, an actively heated or cooled portable container is provided. The container comprises a portable body having a chamber configured to receive and hold a liquid. The container also comprises an active heat transfer module removably coupleable to a bottom portion of the portable body. The module comprises one or more heating elements configured to be in thermal communication with a base of the body when the module is coupled to the body, control circuitry configured to control the operation of the one or more heating elements, and one or more power storage elements configured to provide electrical energy to one or both of the control circuitry and the one or more heating elements. The control circuitry is configured to wirelessly communicate with a remote electronic device to one or both of wirelessly transmit information to the remote electronic device associated with the operation of the module and wirelessly receive instructions from a user via the remote electronic device.

In accordance with another aspect, an actively heated portable baby bottle system is provided. The baby bottle system comprises a body having a chamber configured to receive and hold a liquid, and an active heating module removably coupleable to a bottom portion of the body. The module comprises one or more heating elements configured to be placed in thermal communication with a base of the body when the module is coupled to the body, control circuitry configured to control the operation of the one or more heating elements, and one or more power storage elements configured to provide electrical energy to one or both of the control circuitry and the one or more heating elements. The control circuitry is configured to wirelessly communicate with a remote electronic device to one or both of wirelessly transmit information to the remote electronic device associated with the operation of the module and wirelessly receive instructions from a user via the remote electronic device.

BRIEF DESCRIPTION OF THE DRAWINGS

These and other features, aspects, and advantages of the invention disclosed herein are described below with reference to the drawings of preferred embodiments, which are intended to illustrate and not to limit the invention. Additionally, from figure to figure, the same reference numerals have been used to designate the same components of an illustrated embodiment. The following is a brief description of each of the drawings.

DETAILED DESCRIPTION

The various embodiments described below refer to a drinkware container. One of skill in the art will understand that the terms "drinkware container" broadly refer to any container that can hold a liquid for consumption, and includes containers such as cups, mugs, travel mugs, beer mugs, baby bottles, carafes and other handheld portable liquid containers.

Figure 1:
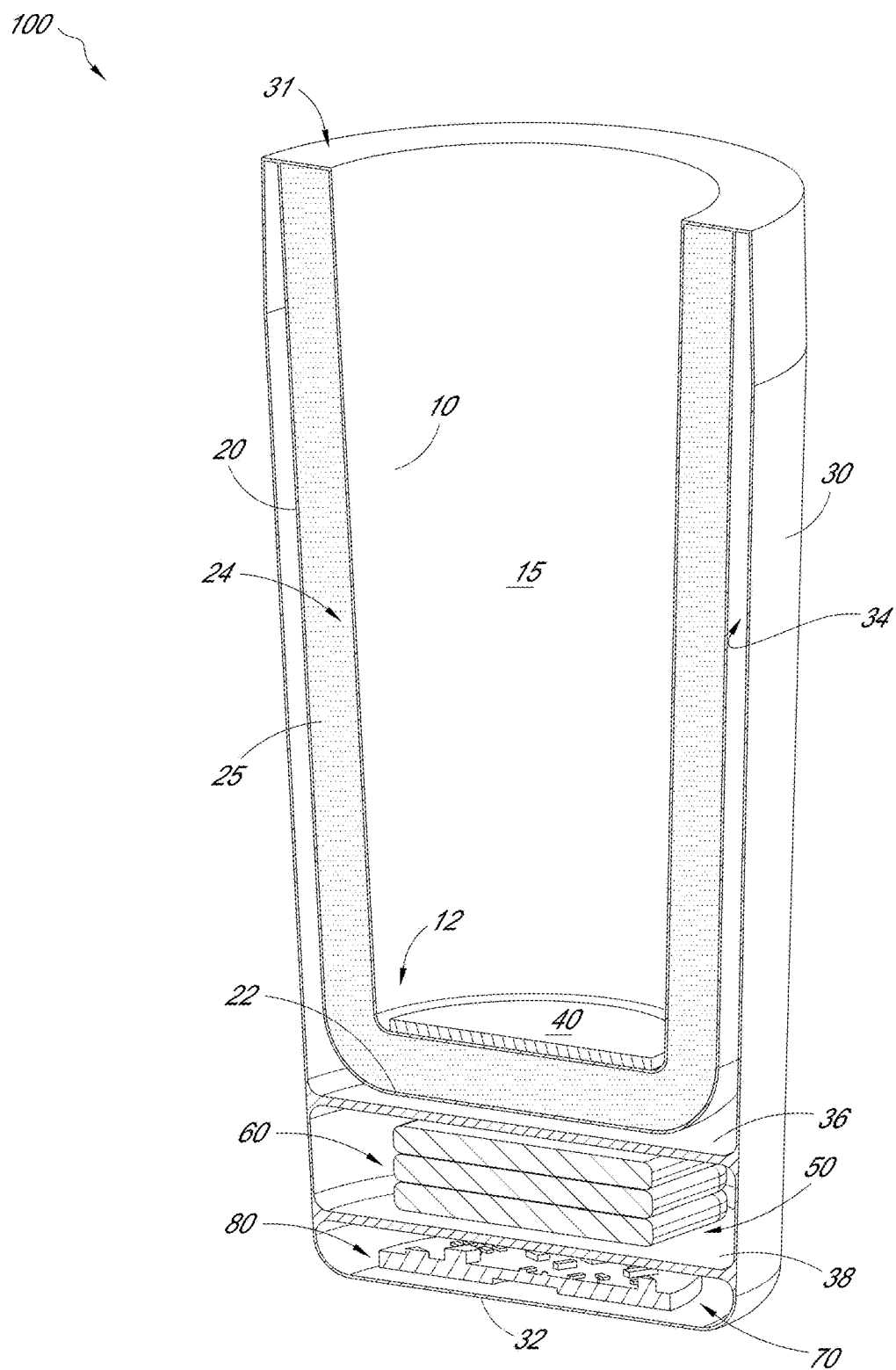
FIG. 1 is a perspective cross-sectional view of an embodiment of a drinkware container.

FIG. 1 shows a lengthwise cross-sectional view of an embodiment of a drinkware container 100 (hereinafter "container"). As only a cross-section is shown, the other half of the drinkware container 100 is excluded in FIG. 1 to illustrate the various components of the container 100. One of skill in the art will understand that the excluded portion of the drinkware container 100 in FIG. 1 is a mirror image of the portion of the drinkware container 100 that is shown in FIG. 1. In the illustrated embodiment, the container 100 is shown as a travel mug. However, as discussed above, the drinkware container 100 can be other types of containers, such as a cup, mug, beer mug, baby bottle, carafe or other handheld portable liquid containers.

The container 100 has an inner sidewall 10 (e.g., a circumferential or cylindrical inner sidewall) and inner bottom wall 12, which together define a chamber 15 that receives and holds a liquid therein. The container 100 also has a second sidewall 20 (e.g., a circumferential or cylindrical inner sidewall) and second bottom wall 22 that are spaced apart from the inner sidewall 10 and inner bottom wall 12, respectively, so as to define a chamber (e.g., an annular chamber) 24 between the inner walls 10, 12 and the second walls 20, 22. Optionally, the inner sidewall 10 can be made of metal (e.g., stainless steel). However, in other embodiments, the inner sidewall 10 can be made of other suitable materials. Optionally, the second sidewall 20 can be made of the same material as the inner sidewall 10 (e.g., both the inner sidewall 10 and the second sidewall 20 can be made of metal, such as stainless steel). In another embodiment, the second sidewall 20 can be made of a different material than the inner sidewall 10; for example, the inner sidewall 10 can be made of metal, such as stainless steel, and the second sidewall 20 can be made of a plastic material that insulates the outer portion of the container 100 from the inner sidewall 10 and the liquid contents of the chamber 15.

The chamber 24 can be filled with a phase change material (PCM) 25. The PCM 25 can be a solid-solid phase change material, or a solid-liquid phase change material. The PCM 25 can be a wax (e.g., Paraffin wax). However, other suitable phase change materials (e.g., a metal) can be used). In the illustrated embodiment the PCM 25 between the sidewalls 10, 20 is the same as the PCM 25 between the bottom walls 12, 22. However, in other embodiments, the PCM 25 between the sidewalls 10, 20 can be different than the PCM 25 between the bottom walls 12, 22.

The PCM 25 can be selected to have a predetermined transition (e.g., melting) temperature that generally corresponds to a suitable drinking temperature for a heated liquid. In some embodiments, the predetermined transition temperature can optionally be between 135 degrees F. and 145 degrees F., such as optionally be 140 degrees F. In one embodiment, when the liquid (e.g., hot coffee, hot tea, soup) poured into the chamber 15 of the container 100 has a temperature above the predetermined transition temperature, the PCM 25 can absorb heat from the liquid to cause the PCM 25 to transition, for example, from a solid to a liquid, thereby decreasing the temperature of the liquid toward the said predetermined temperature. As the temperature of the liquid drops (e.g., via conduction of heat from the liquid through the inner sidewall 10 to the PCM 25), the operation of the container 100 approaches a steady state of operation where the temperature of the liquid approaches the predetermined transition temperature, where it can remain for an extended period of time (e.g., for at least 1 hour, for at least 2 hours, for at least 3 hours, etc.).

The container 100 can have an outer sidewall 30 (e.g., a circumferential or cylindrical inner sidewall) that extends from a rim 31 of the container 30 to an outer bottom wall 32. The rim 31 can optionally define a drinking lip of the container 100. Optionally, the outer sidewall 30 and outer bottom wall 32 can be a single piece (e.g., monolithic with no seams). However, in other embodiments, at least a portion of the outer sidewall 30 can be separate from the bottom wall 32, as discussed further below. The outer sidewall 30 can be disposed radially outward from the second sidewall 20. Optionally, the outer sidewall 30 can be radially spaced apart from the second sidewall 20 to define a chamber 34 (e.g., an annular chamber) therebetween. In one embodiment, the chamber 34 can provide an air gap between the second sidewall 20 and outer sidewall 30, where said air gap can insulate the outer sidewall 30 from the second sidewall 20 and the inner sidewall 10. However, in other embodiments, the outer sidewall 30 can be adjacent the second sidewall 20 so that there is no gap therebetween. Optionally, the outer sidewall 30 can be made of an insulative material (e.g., foam, plastic).

With continued reference to FIG. 1, the container 100 can have a heating element 40 disposed above (e.g., on) the inner bottom wall 12 and covers at least a portion of the inner bottom wall 12 so that it is in direct thermal communication with liquid in the chamber 15. In the illustrated embodiment, the heating element 40 covers substantially the entire bottom inner wall 12. The heating element 40 is optionally a resistive heater. In one embodiment, the heating element 40 can be defined by a trace pattern screen printed onto the surface of the inner bottom wall 12. A connecting lead line (not shown) can electrically connects the heating element 40 to one or more power storage elements 60 disposed in a first bottom chamber 50 and/or control circuitry 80 disposed in a second bottom chamber 70. For example, in one embodiment such a leadline can extend from the heating element 40 upward along the inner sidewall 10, downward along the second sidewall 20 and then optionally cross through a dividing wall 36 that separates the one or more power storage elements 60 from the second bottom wall 22. The lead line can optionally extend through a second dividing wall 38 that separates the one or more power storage elements 60 from the control circuitry 80. In another embodiment, said leadline can extend from the heating element 40, through a conduit (not shown) between the inner bottom wall 12 and second bottom wall 22, and optionally pass through the bottom wall 36 and/or second bottom wall 38 to electrically connect the heating element with the one or more power storage elements and/or control circuitry 80.

In the illustrated embodiment, the outer sidewall 30 and outer bottom wall 32 are optionally a single piece (e.g. monolithic with no seams), such that the one or more power storage elements 60 (e.g., batteries, capacitors) and control circuitry 80 are permanently housed in the chambers 50, 70. In another embodiment, at least a portion of the outer sidewall 30 can be separate from the outer bottom wall 32 (and/or at least another portion of the outer sidewall 30) so that the one or more power storage elements 60 and control circuitry 80 are housed in a module that can be removably coupled to the rest of the container 100. For example, said module can be coupled to the bottom plate 36 via a threaded connection, key-slot connection, or other suitable connection. In such an embodiment, the leadline from the heating element 40 can terminate at the bottom plate 36 and establishes an electrical connection with a separate leadline in said module when the module is coupled to the container 100. In still another embodiment, the outer bottom wall 32 can be removably attached to the container 100 and can be removed to access the control circuitry 80 and/or one or more power storage elements 60 for maintenance, testing and/or replacement.

The control circuitry 80 can control the charging of the one or more power storage elements (e.g., the control circuitry 80 can include a charging circuit) can control delivery of power to the heating element 40. In one embodiment, the control circuitry 80 can control delivery of power to the heating element 40 to maintain the liquid in the chamber 15 at the predetermined temperature. In another embodiment, the control circuitry 80 can control delivery of power to the heating element 40 to input heat to the liquid to increase the temperature of the liquid to a user selected temperature. Said user selected temperature can optionally be provided via a user interface on the body of the container 100. In another embodiment, the user selected temperature can be provided wirelessly to the control circuitry (which can have a receiver) from a portable electronic device (e.g., smart phone or tablet computer). Optionally, the control circuitry 80 can control delivery of power to the heating element 40 based at least in part on information from one or more sensors that sense a parameter of quality of the liquid (e.g., temperature, volume, acidity, pH) where said one or more sensors can be on a surface of one or both of the inner sidewall 10 and inner bottom wall 12.

Figure 2:
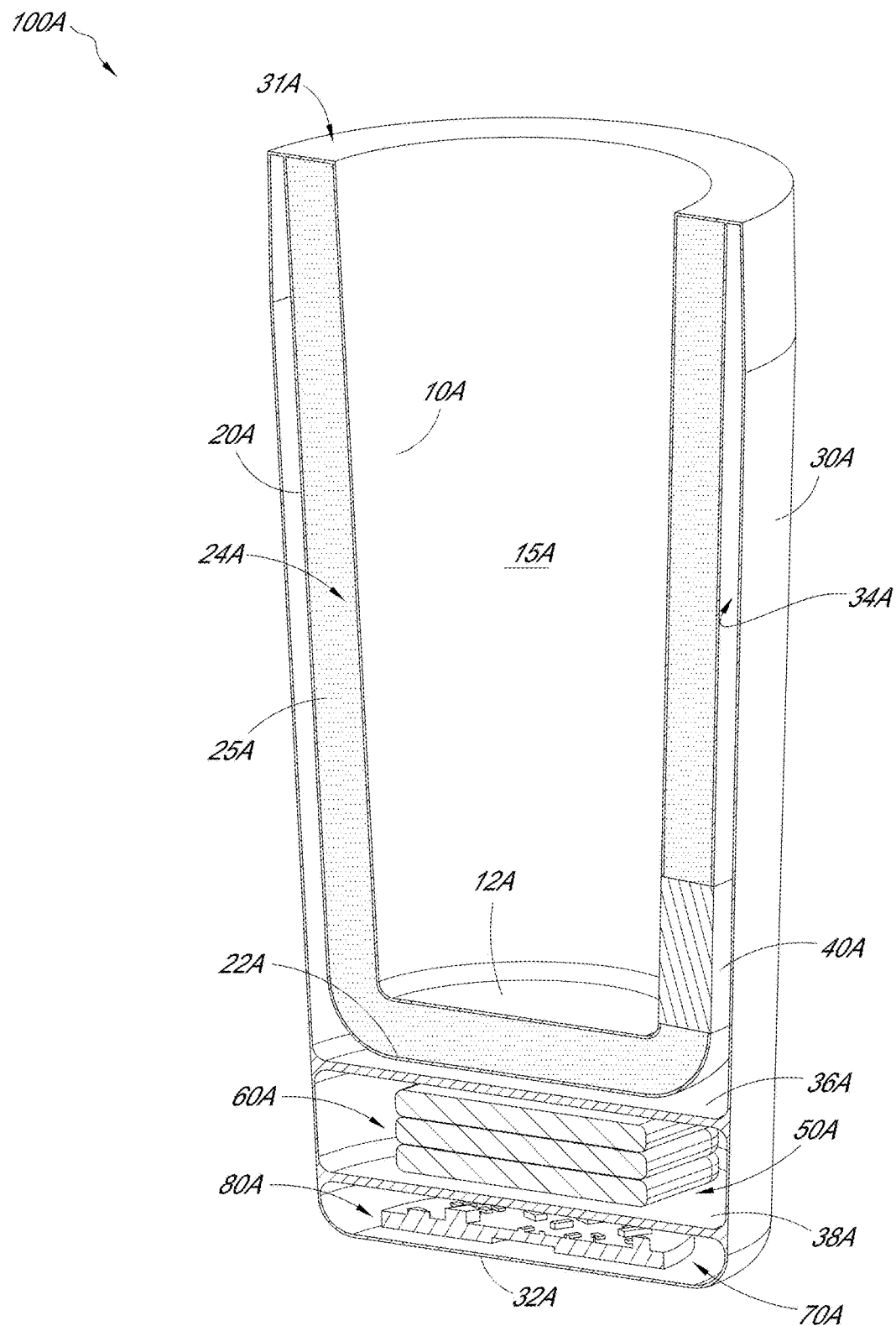
FIG. 2 is a perspective cross-sectional view of an embodiment of a drinkware container.

FIG. 2 illustrates a cross-sectional view of an embodiment of a drinkware container 100A (hereinafter "container 100A"). The container 100A is similar to the container 100 shown in FIG. 1, except as noted below. Thus, the reference numerals used to designate the various components of the container 100A are identical to those used for identifying the corresponding components of the container 100 in FIG. 1, except that the letter "A" has been added to the reference numerals of the container 100A. Therefore the description for the various components of the container 100 shown in FIG. 1 are understood to apply to the corresponding components of the container 100A in FIG. 2, except as described below.

As only a cross-section is shown, the other half of the drinkware container 100A is excluded in FIG. 2 to illustrate the various components of the container 100A. One of skill in the art will understand that the excluded portion of the drinkware container 100A in FIG. 2 is a mirror image of the portion of the drinkware container 100A that is shown in FIG. 2.

As shown in FIG. 2, the heating element 40A can be in thermal communication with (e.g., in contact with or disposed against) a portion of the inner sidewall 10A of the container 100A (e.g., a portion of the circumference of the inner sidewall 10A, such as one defined by an arc length less than the circumference of the inner sidewall 10A), such as in a side portion of the chamber 24A. Though the illustrated embodiment shows the heating element 40A axially disposed proximate the inner bottom wall 12A, in other embodiments, the heating element 40A can be disposed at other locations along the inner sidewall 10A (e.g., midway between the inner bottom wall 12A and the rim 31A, proximate the rim 31A, etc.). The PCM 25A can be disposed in the chamber 24A above and below the heating element 40A. A lead line (not shown) can extend from the heating element 40A (e.g., from a portion of the second sidewall 20A in thermal and/or electrical communication with the heating element 40A) to one or both of the one or more power storage elements 60A and control circuitry 80A, as discussed above in connection with the container 100 of FIG. 1. The PCM 25A and heating element 40A can operate as discussed above for the PCM 25 and heating element 40.

Operation of the heating element 40A can induce a circulation flow (e.g., a convection current) in the chamber 15A holding liquid to create a convection or "waterfall effect," where liquid circulates upward from the heating element 40A and along a portion of the inner sidewall 10A in thermal communication with the heating element 40A, across to an opposite portion of the sidewall 10A, downward along said opposite portion of the sidewall 10A to the inner bottom wall 12A, and across the inner bottom wall 12A back to the portion of the inner sidewall 10A in thermal communication with the heating element 40A. Said convection or circulation advantageously results in the liquid in the bottom portion of the container 100A and the liquid in the top portion of the container 100A having substantially the same temperature (e.g., differ in temperature by less than 15 degrees F., differs in temperature by less than 10 degrees F., differ in temperature by less than 5 degrees F., differ in temperature by less than 3 degrees F., differ in temperature by less than 1 deg. F) such that liquid in the container 100A has a substantially uniform temperature during use of the container 100A.

FIG. 2 illustrates an embodiment of a drinkware container 100B (hereinafter "container 100B"). The container 100B is similar to the containers 100 and 100A shown in FIGS. 1-2, except as noted below. Thus, the reference numerals used to designate the various components of the container 100B are identical to those used for identifying the corresponding components of the container 100 in FIG. 1, except that the letter "B" has been added to the reference numerals of the container 100B. Therefore the description for the various components of the container 100 and container 100A shown in FIGS. 1-2 are understood to apply to the corresponding components of the container 100B in FIG. 3, except as described below.

Figure 3:
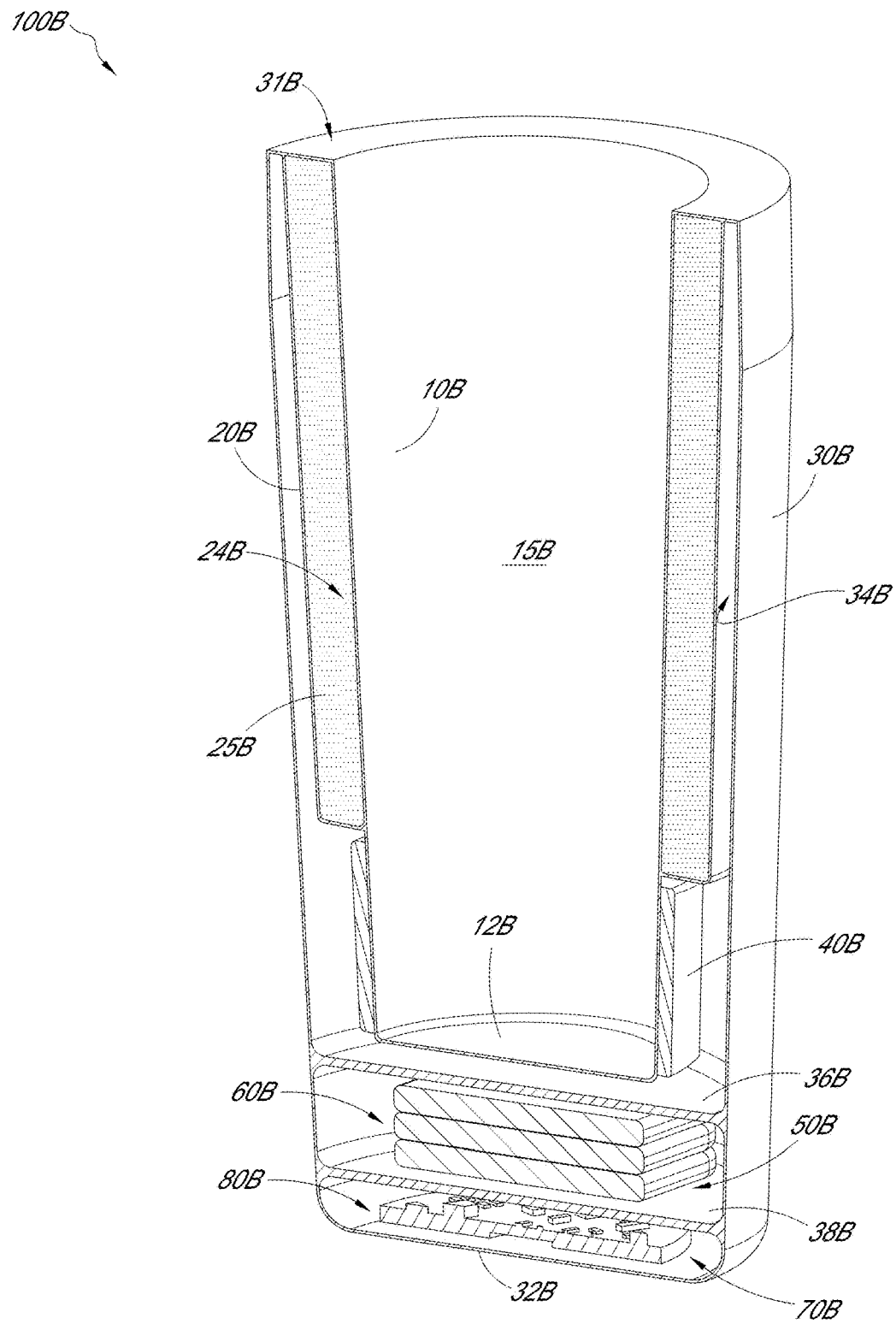
FIG. 3 is a perspective cross-sectional view of an embodiment of a drinkware container.

As only a cross-section is shown, the other half of the drinkware container 100B is excluded in FIG. 3 to illustrate the various components of the container 100B. One of skill in the art will understand that the excluded portion of the drinkware container 100B in FIG. 3 is a mirror image of the portion of the drinkware container 100B that is shown in FIG. 3.

As shown in FIG. 3, the heating element 40B extends along the entire circumference of the inner sidewall 10B and is in thermal communication with a portion of the sidewall 10B. Though the illustrated embodiment shows the heating element 40B axially optionally disposed proximate the inner bottom wall 12B, in other embodiments, the heating element 40B can be disposed at other locations along the inner sidewall 10B (e.g., midway between the inner bottom wall 12B and the rim 31B, proximate the rim 31B, etc.). The PCM 25B can be disposed in a chamber 24B that extends above the heating element 40B (e.g., solely above the heating element 40B so that there is no PCB 25B disposed below the heating element 40B). A lead line (not shown) can extend from the heating element 40B to one or both of the one or more power storage elements 60B and control circuitry 80B, as discussed above in connection with the container 100 of FIG. 1.

The PCM 25B and heating element 40B can operate as discussed above for the PCM 25, 25A and heating element 40, 40A. The heating element 40B can optionally be a resistive heater (such as a coil heater), or a thermoelectric element (e.g., Peltier element). Operation of the heating element 40B can induce a circulation flow (e.g., a convection current) in the chamber 15B to create a convection or "waterfall effect," as discussed above, which can advantageously result in the liquid in the bottom portion of the container 100B and the liquid in the top portion of the container 100B having substantially the same temperature (e.g., differ in temperature by less than 15 degrees F., differs in temperature by less than 10 degrees F., differ in temperature by less than 5 degrees F., differ in temperature by less than 3 degrees F., differ in temperature by less than 1 deg. F) such that liquid in the container 100B has a substantially uniform temperature during use of the container 100B.

Figure 4:
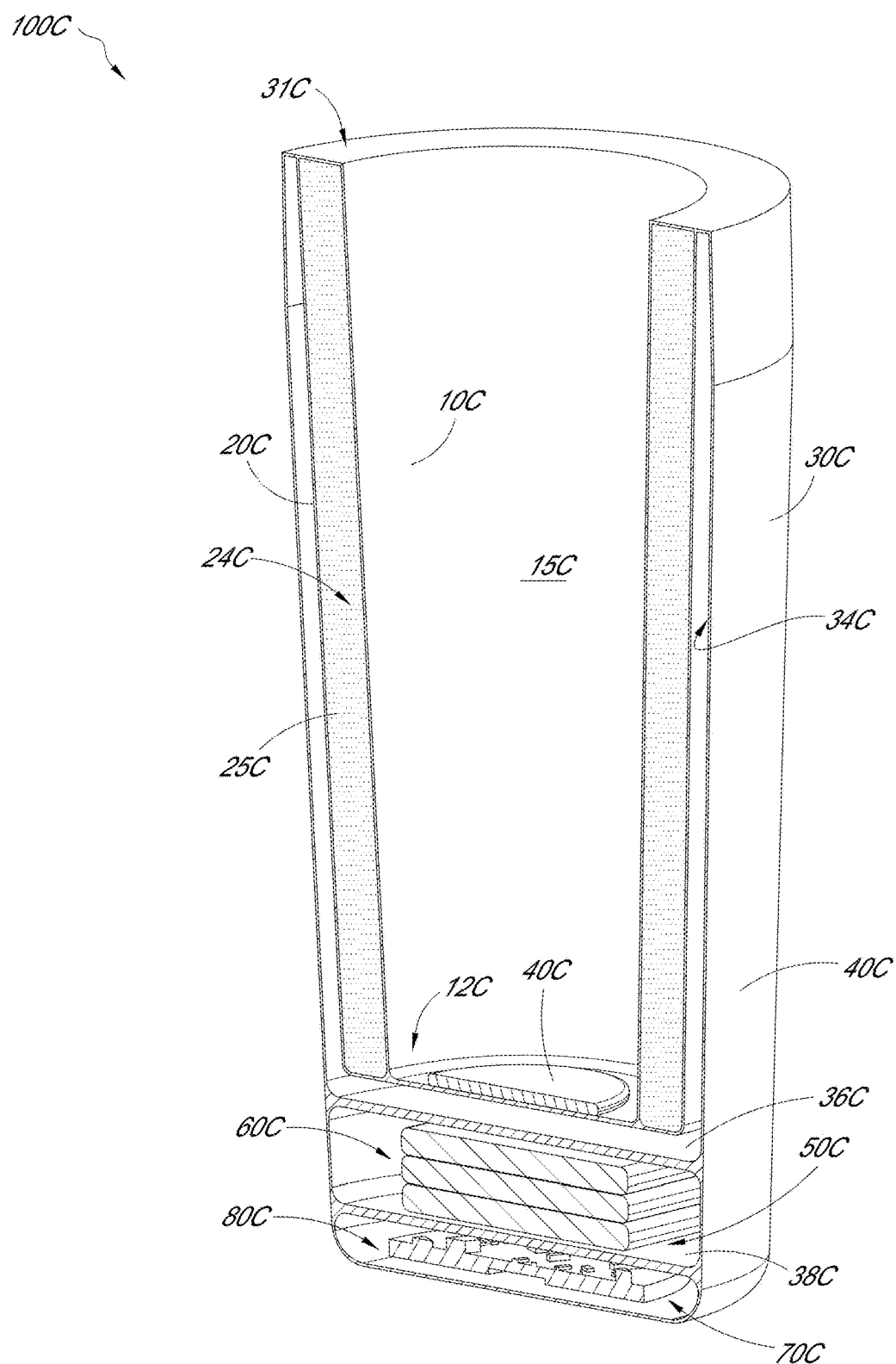
FIG. 4 is a perspective cross-sectional view of an embodiment of a drinkware container.

FIG. 4 illustrates an embodiment of a drinkware container 100C (hereinafter "container 100C"). The container 100C is similar to the container 100 shown in FIG. 1, except as noted below. Thus, the reference numerals used to designate the various components of the container 100C are identical to those used for identifying the corresponding components of the container 100 in FIG. 1, except that the letter "C" has been added to the reference numerals of the container 100C. Therefore the description for the various components of the container 100 shown in FIG. 1 are understood to apply to the corresponding components of the container 100C in FIG. 4, except as described below.

As only a cross-section is shown, the other half of the drinkware container 100C is excluded in FIG. 4 to illustrate the various components of the container 100C. One of skill in the art will understand that the excluded portion of the drinkware container 100C in FIG. 4 is a mirror image of the portion of the drinkware container 100C that is shown in FIG. 4.

As shown in FIG. 4, the chamber 24C that contains the PCM 25C extends solely above a plane defined by the inner bottom wall 12C, so that the PCM 25C is not disposed below the inner bottom wall 12C (i.e., the chamber 24C does not extend below the inner bottom wall 12C).

The heating element 40C is optionally disposed above (e.g., on) the inner bottom wall 12C and covers at least a portion of the inner bottom wall 12C so that it is in direct thermal communication with liquid in the chamber 15C. In the illustrated embodiment, the heating element 40C covers substantially the entire bottom inner wall 12C. The heating element 40C is optionally a resistive heater. In one embodiment, the heating element 40C can be defined by a trace pattern screen printed onto the surface of the inner bottom wall 12C.

Figure 5:
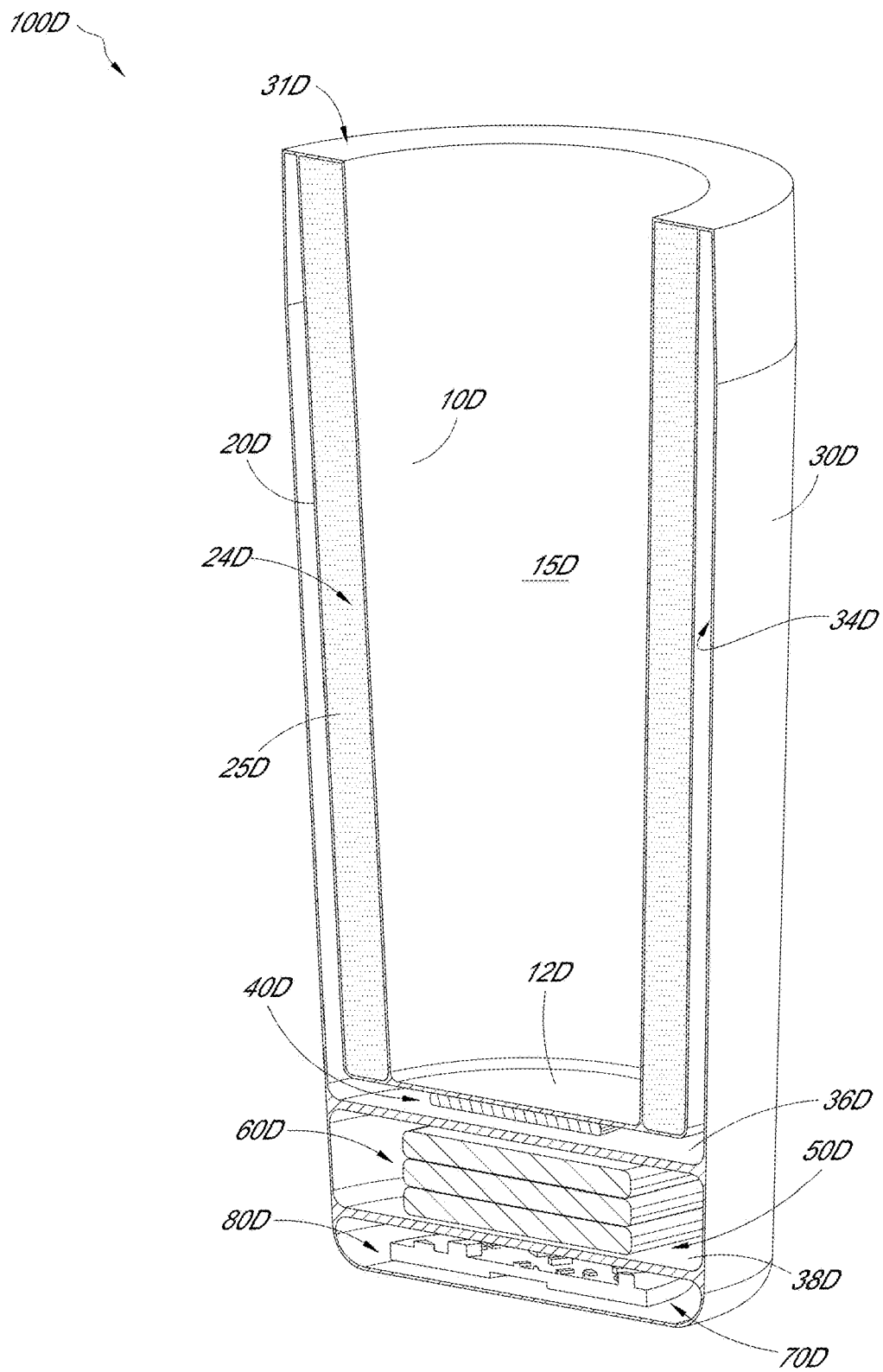
FIG. 5 is a perspective cross-sectional view of an embodiment of a drinkware container.

FIG. 5 illustrates an embodiment of a drinkware container 100D (hereinafter "container 100D"). The container 100D is similar to the container 100C shown in FIG. 4, except as noted below. Thus, the reference numerals used to designate the various components of the container 100D are identical to those used for identifying the corresponding components of the container 100C in FIG. 4, except that the letter "D" has replaced the letter "C" in the reference numerals of the container 100C. Therefore the description for the various components of the containers 100, 100C shown in FIGS. 1, 4 are understood to apply to the corresponding components of the container 100D in FIG. 5, except as described below.

As only a cross-section is shown, the other half of the drinkware container 100D is excluded in FIG. 5 to illustrate the various components of the container 100D. One of skill in the art will understand that the excluded portion of the drinkware container 100D in FIG. 5 is a mirror image of the portion of the drinkware container 100D that is shown in FIG. 5.

As shown in FIG. 5, the container 100D differs from the container 100C solely in that the heating element 40D is optionally disposed below (e.g., in contact with a bottom surface of) the inner bottom wall 12D and covers at least a portion of the bottom surface of the inner bottom wall 12D so that the heating element 40D is in thermal communication (e.g., indirect thermal communication) with liquid in the chamber 15D via conduction heat transfer through the inner bottom wall 12D. The heating element 40D is optionally a resistive heater. In one embodiment, the heating element 40D can be defined by a trace pattern screen printed onto at least a portion of the bottom surface of the inner bottom wall 12D. A lead line (not shown) can extend from the heating element 40D to one or both of the one or more power storage elements 60D and control circuitry 80D, as discussed above in connection with the container 100 of FIG. 1.

Figure 6:
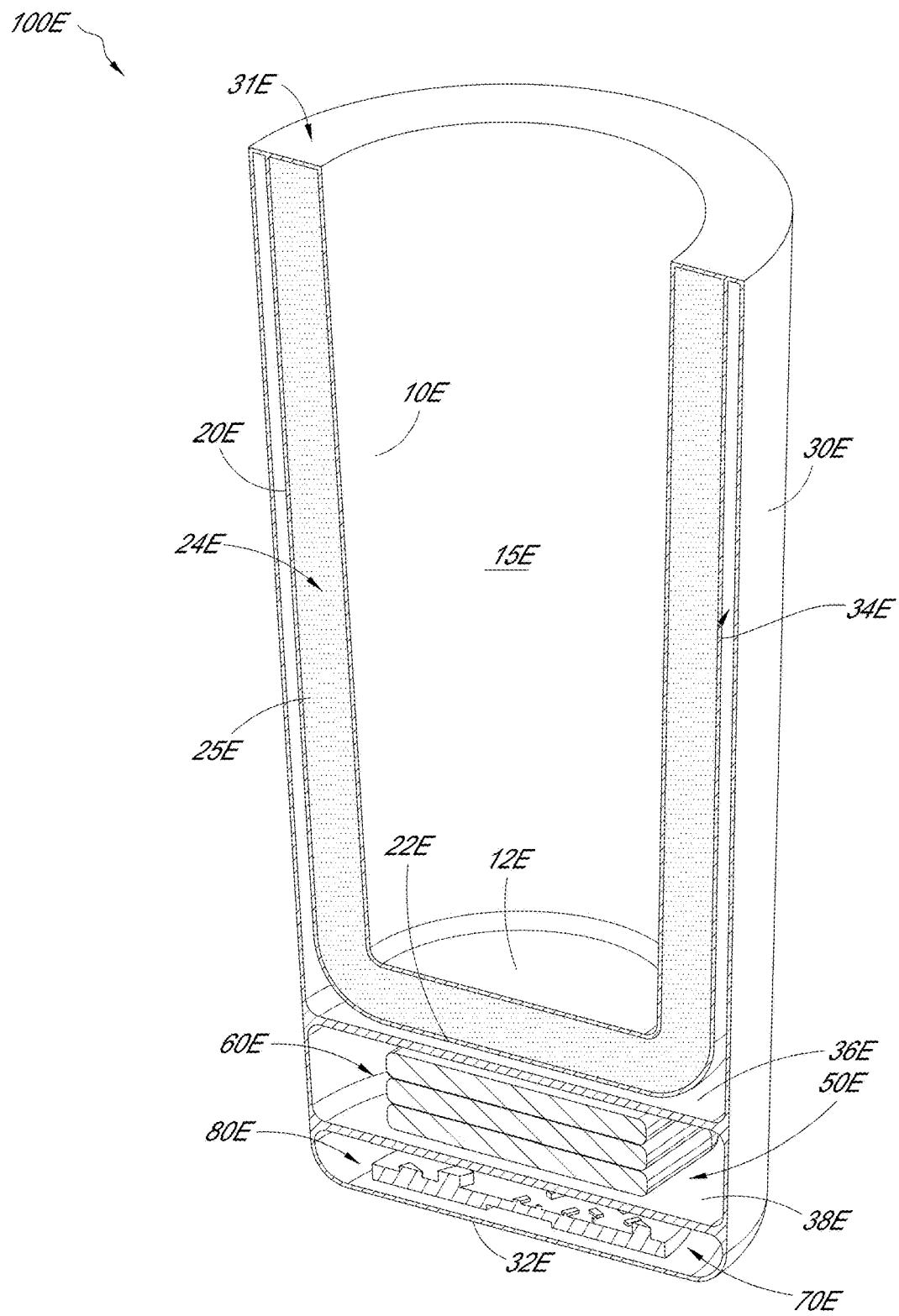
FIG. 6 is a perspective cross-sectional view of an embodiment of a drinkware container.

FIG. 6 illustrates an embodiment of a drinkware container 100E (hereinafter "container 100E"). The container 100E is similar to the container 100 shown in FIG. 1, except as noted below. Thus, the reference numerals used to designate the various components of the container 100E are identical to those used for identifying the corresponding components of the container 100 in FIG. 1, except that the letter "E" has been added to the reference numerals of the container 100E. Therefore the description for the various components of the container 100 shown in FIG. 1 are understood to apply to the corresponding components of the container 100E in FIG. 6, except as described below.

As only a cross-section is shown, the other half of the drinkware container 100E is excluded in FIG. 6 to illustrate the various components of the container 100E. One of skill in the art will understand that the excluded portion of the drinkware container 100E in FIG. 6 is a mirror image of the portion of the drinkware container 100E that is shown in FIG. 6.

In FIG. 6, the heating element is excluded to show the inner bottom wall 12E of the container 100E and the chamber 24C that extends between the second sidewall 20*e* and outer side wall 30E as well as between the inner bottom wall 12*e* and the bottom plate 36E. In one embodiment the chamber 34E can be filled with air, which can provide for thermal insulation of the outer sidewall 30E relative to the inner and second sidewalls 10E, 20E. Such insulation can facilitate the ability of a user to comfortably hold the container 100E with a hot liquid therein (e.g., for extended periods of time) without burning their hand or feeling uncomfortable after a while due to the heat transferred from the hot liquid to the outer sidewall 30E. Though the heating element is excluded from FIG. 6, one of skill in the art will recognize that the container 100E can have a heating element like the heating element 40, 40A, 40B, 40C or 40D previously described.

Figure 7:
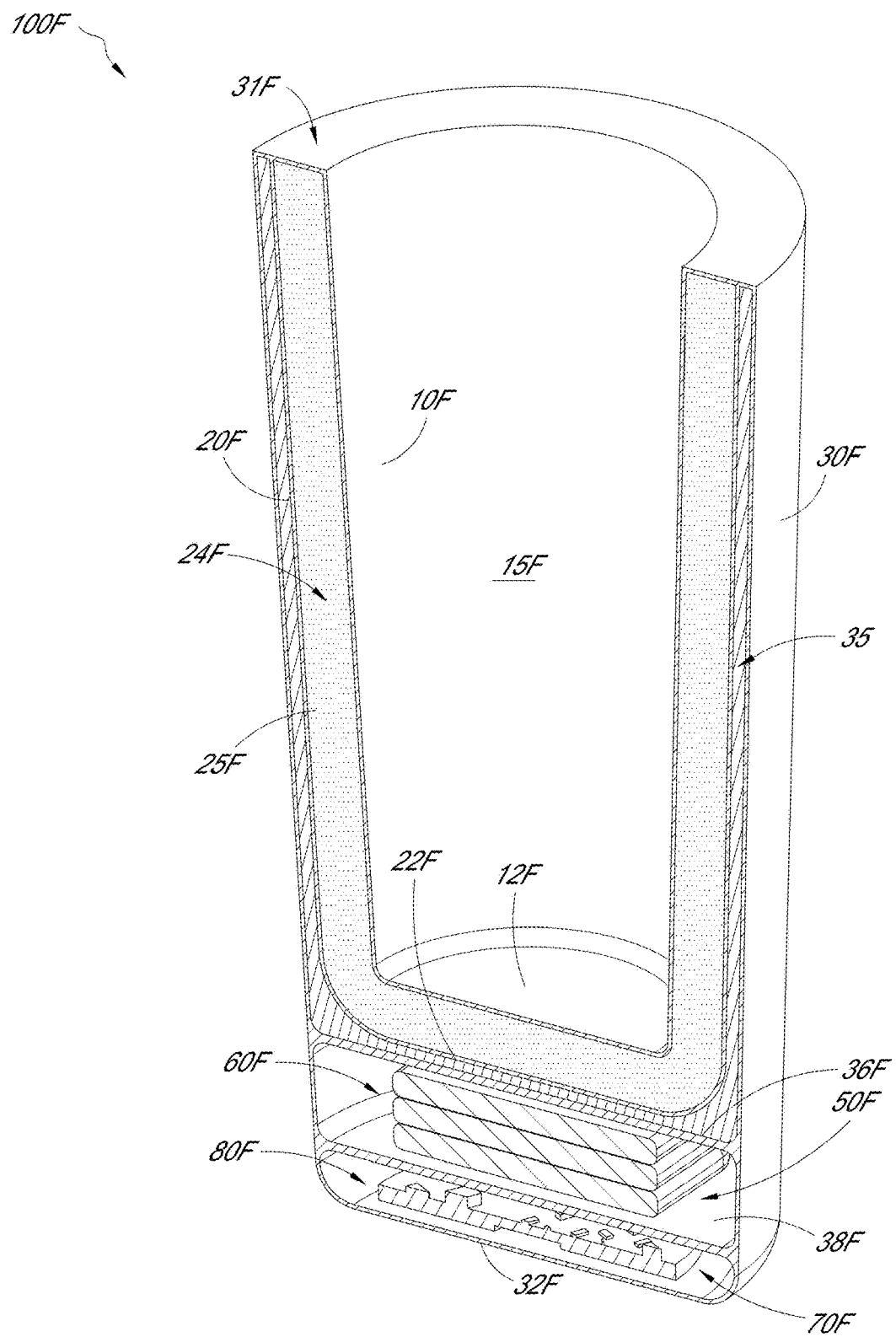
FIG. 7 is a perspective cross-sectional view of an embodiment of a drinkware container.

FIG. 7 illustrates an embodiment of a drinkware container 100F (hereinafter "container 100F"). The container 100F is similar to the containers 100, 100E shown in FIGS. 1, 6, except as noted below. Thus, the reference numerals used to designate the various components of the container 100F are identical to those used for identifying the corresponding components of the container 100 in FIG. 1, except that the letter "F" has been added to the reference numerals of the container 100F. Therefore the description for the various components of the container 100 shown in FIG. 1 are understood to apply to the corresponding components of the container 100F in FIG. 7, except as described below.

As only a cross-section is shown, the other half of the drinkware container 100F is excluded in FIG. 7 to illustrate the various components of the container 100F. One of skill in the art will understand that the excluded portion of the drinkware container 100F in FIG. 7 is a mirror image of the portion of the drinkware container 100F that is shown in FIG. 7.

In FIG. 7, the chamber 34F between the second sidewall 20F and the outer sidewall 30F can be filled with a material 35. The material 35 can be a thermally insulating material, which can provide for thermal insulation of the outer sidewall 30F relative to the inner and second sidewalls 10F, 20F. Such insulation can facilitate the ability of a user to comfortably hold the container 100F with a hot liquid therein (e.g., for extended periods of time) without burning their hand or feeling uncomfortable after a while due to the heat transferred from the hot liquid to the outer sidewall 30F. The material 35 can be a plastic material, a polymer material or a metal. In some embodiments, the material 35 is optionally a solid material (e.g., a foam material). In other embodiments, the material is optionally a liquid material. Though the heating element is excluded from FIG. 7, one of skill in the art will recognize that the container 100F can have a heating element like the heating element 40, 40A, 40B, 40C or 40D previously described.

Figure 8:
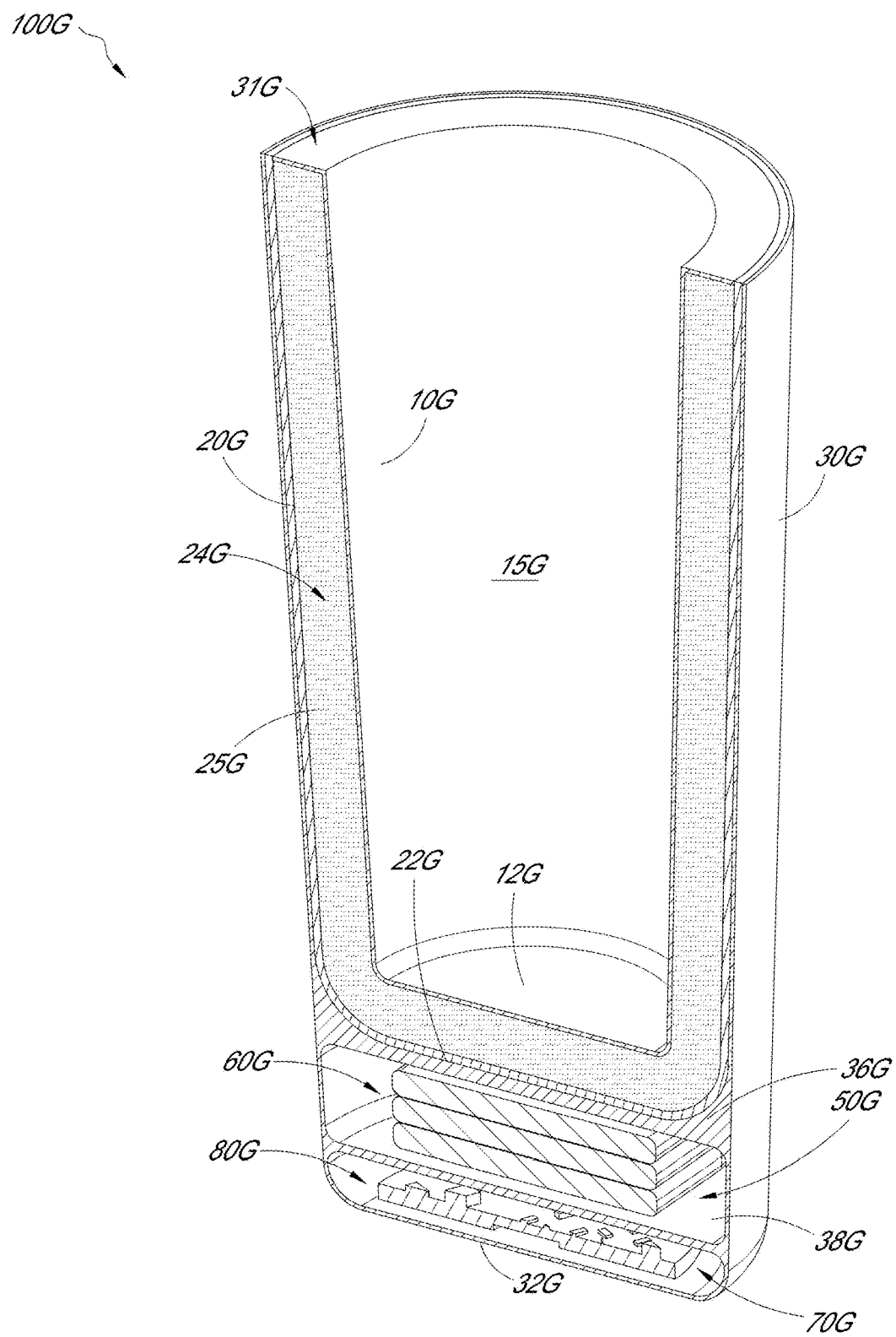
FIG. 8 is a perspective cross-sectional view of an embodiment of a drinkware container.

FIG. 8 illustrates an embodiment of a drinkware container 100G (hereinafter "container 100G"). The container 100G is similar to the container 100 shown in FIG. 1, except as noted below. Thus, the reference numerals used to designate the various components of the container 100G are identical to those used for identifying the corresponding components of the container 100 in FIG. 1, except that the letter "G" has been added to the reference numerals of the container 100G. Therefore the description for the various components of the container 100 shown in FIG. 1 are understood to apply to the corresponding components of the container 100G in FIG. 8, except as described below.

As only a cross-section is shown, the other half of the drinkware container 100G is excluded in FIG. 8 to illustrate the various components of the container 100G. One of skill in the art will understand that the excluded portion of the drinkware container 100G in FIG. 8 is a mirror image of the portion of the drinkware container 100G that is shown in FIG. 8.

In FIG. 8, the heating element is excluded to show the inner bottom wall 12G of the container 100G. Though the heating element is excluded from FIG. 8, one of skill in the art will recognize that the container 100G can have a heating element like the heating element 40, 40A, 40B, 40C or 40D previously described. With continued reference to FIG. 8, the inner sidewall 10G can be made of a different material than the second sidewall 20G. In one embodiment, the inner sidewall 10G can be made of metal, such as stainless steel, and the second sidewall 20G can be made of a different material (e.g., a plastic material) with lower thermal conductivity properties, such that the second sidewall insulates the outer portion of the container 100G from the liquid in the chamber 15G and the inner sidewall 10G. Such insulation can facilitate the ability of a user to comfortably hold the container 100G with a hot liquid therein (e.g., for extended periods of time) without burning their hand or feeling uncomfortable after a while due to the heat transferred from the hot liquid to the outer surface of the container 100G.

With continued reference to FIG. 8, the outer sidewall 30G can optionally be adjacent (e.g., in contact with) the second sidewall 20G so that there is no gap (such as chamber 34 in FIG. 1) between the second sidewall 20G and the outer sidewall 30G. As discussed previously, the outer sidewall 30G can optionally be made of an insulative material (e.g., a foam material, a plastic material, etc.). In another embodiment, the outer sidewall 30G can be excluded such that the second sidewall 20G defines the outer wall of the container 100G. In such an embodiment, the chambers 50G, 70G that house the one or more power storage elements 60G and control circuitry 80G would have a sidewall that is generally aligned with the second sidewall 20G.

Figure 9:
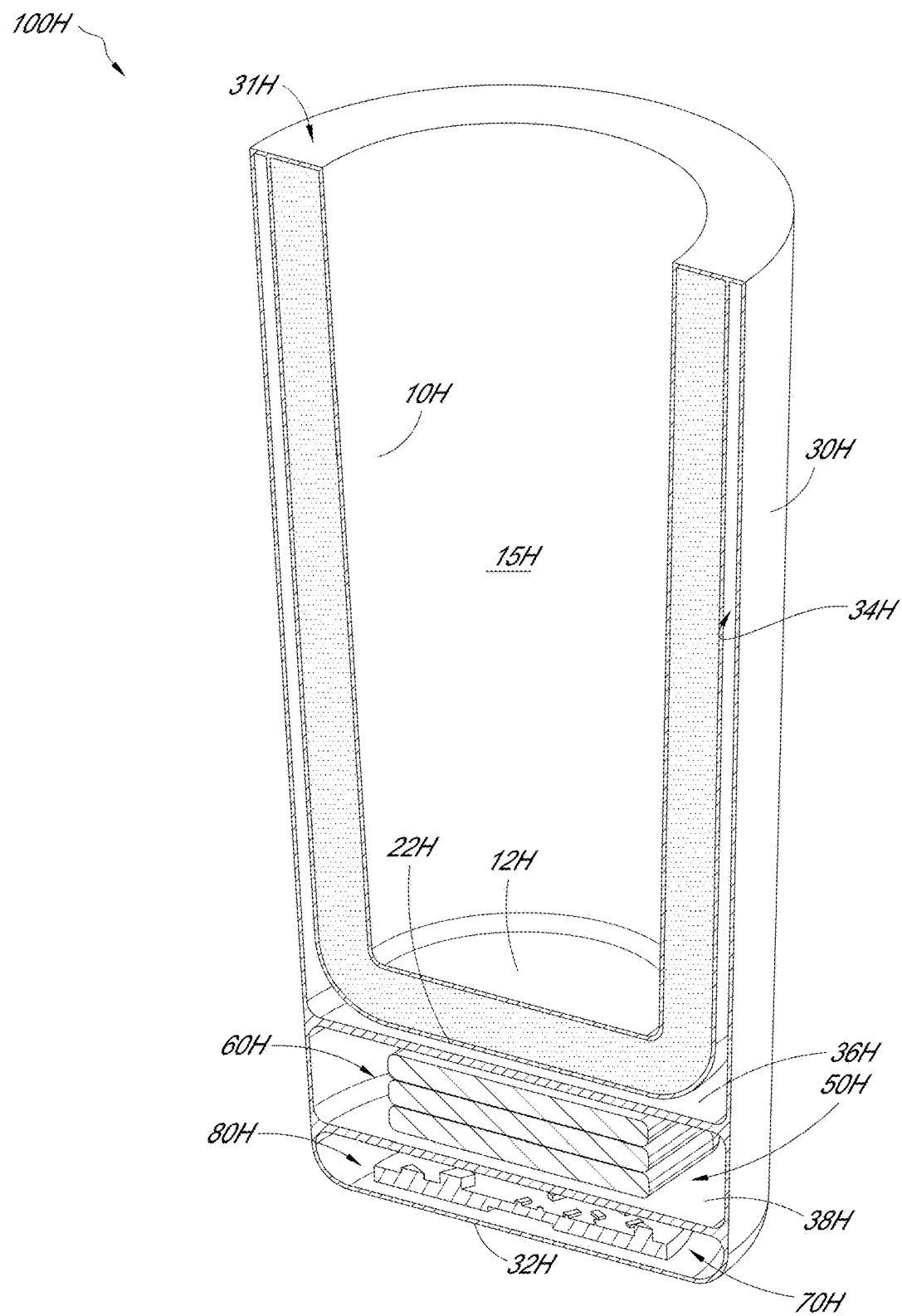
FIG. 9 is a perspective cross-sectional view of an embodiment of a drinkware container.

FIG. 9 illustrates an embodiment of a drinkware container 100H (hereinafter "container 100H"). The container 100H is similar to the container 100 shown in FIG. 1, except as noted below. Thus, the reference numerals used to designate the various components of the container 100H are identical to those used for identifying the corresponding components of the container 100 in FIG. 1, except that the letter "H" has been added to the reference numerals of the container 100H. Therefore the description for the various components of the container 100 shown in FIG. 1 are understood to apply to the corresponding components of the container 100H in FIG. 9, except as described below.

As only a cross-section is shown, the other half of the drinkware container 100H is excluded in FIG. 9 to illustrate the various components of the container 100H. One of skill in the art will understand that the excluded portion of the drinkware container 100H in FIG. 9 is a mirror image of the portion of the drinkware container 100H that is shown in FIG. 9.

In FIG. 9, the heating element is excluded to show the inner bottom wall 12H of the container 100H. Though the heating element is excluded from FIG. 9, one of skill in the art will recognize that the container 100H can have a heating element like the heating element 40, 40A, 40B, 40C or 40D previously described. With continued reference to FIG. 9, the chamber 34H between the second sidewall 20H and the outer sidewall 30H can be under a vacuum so that it defines a vacuum insulated chamber. The chamber 34H can therefore thermally insulate the outer sidewall 30H from the inner and second sidewalls 10H, 20H to facilitate the ability of a user to comfortably hold the container 100H with a hot liquid therein (e.g., for extended periods of time) without burning their hand or feeling uncomfortable after a while due to the heat transferred from the hot liquid to the outer surface of the container 100H. The chamber 34H can also thermally insulate the bottom plate 36H from the second bottom wall 22H.

Figure 10:
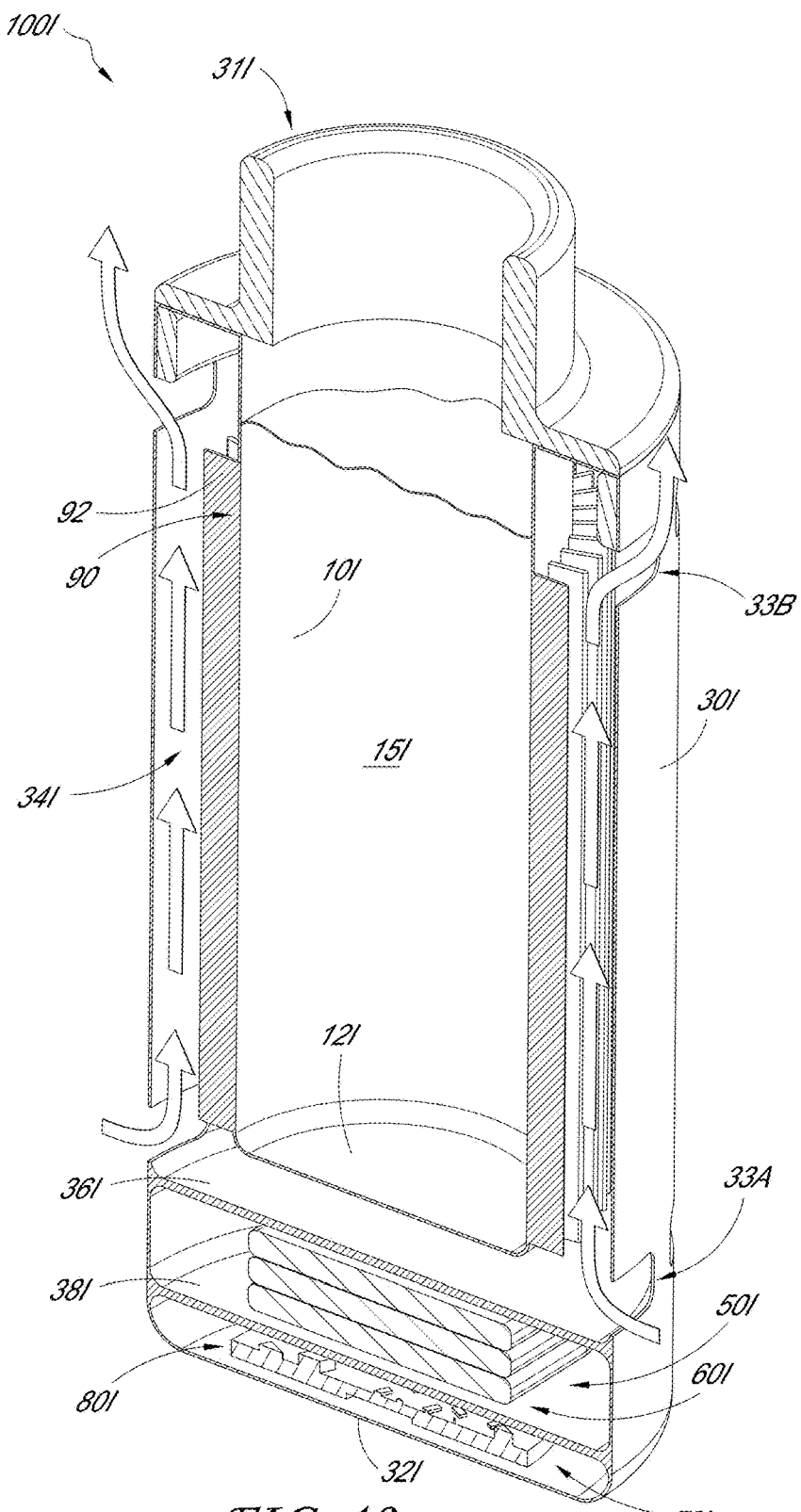
FIG. 10 is a perspective cross-sectional view of an embodiment of a drinkware container.

FIG. 10 illustrates an embodiment of a drinkware container 100I (hereinafter "container 100I"). The container 100I is similar to the container 100 shown in FIG. 1, except as noted below. Thus, the reference numerals used to designate the various components of the container 100I are identical to those used for identifying the corresponding components of the container 100 in FIG. 1, except that the letter "I" has been added to the reference numerals of the container 100I. Therefore the description for the various components of the container 100 shown in FIG. 1 are understood to apply to the corresponding components of the container 100I in FIG. 10, except as described below. The container 100I excludes the use of a phase change material (PCM) and chamber where the PCM is contained.

As only a cross-section is shown, the other half of the drinkware container 100I is excluded in FIG. 10 to illustrate the various components of the container 100I. One of skill in the art will understand that the excluded portion of the drinkware container 100I in FIG. 10 is a mirror image of the portion of the drinkware container 100I that is shown in FIG. 10.

As shown in FIG. 10, the container 100I has an inner sidewall 10I (e.g., circumferential or cylindrical inner sidewall 10I) and an inner bottom wall 12I that together at least partially define the chamber 15I in the container that holds liquid (e.g., hot coffee, hot tea, soup, hot chocolate). The container has an outer sidewall 30I radially spaced apart from the inner sidewall 10I to define a chamber 34I (e.g., annular chamber or gap) therebetween. Additionally, the outer sidewall 30I has one or more proximal openings 33b formed in a proximal portion of the outer sidewall 30I and one or more distal openings 33a formed in a distal portion of the outer sidewall 30I. The openings 33a, 33b allow air to flow through the one or more distal openings 33a, along the chamber 34I and out the one or more proximal openings 33b, where said airflow provides a passive chimney effect to draw heat away from the inner sidewall 10 and therefore draw heat from the liquid in the chamber 15I. Said airflow can also facilitate thermal insulation of the outer sidewall 30I relative to the inner sidewall 10I to facilitate the ability of a user to comfortably hold the container 100I with a hot liquid therein (e.g., for extended periods of time) without burning their hand or feeling uncomfortable after a while due to the heat transferred from the hot liquid to the outer surface of the container 100I.

Optionally, the one or more proximal and distal openings 33a, 33b can remain open at all times such that said chimney effect through the chamber 34I is available during use of the container 100I. In other embodiments, one or both of the one or more proximal and distal openings 33a, 33b can be selectively closed, as further described below.

Optionally, the container 100I can have a heat sink 90 in thermal communication with the inner side wall 10I. In the illustrated embodiment, the heat sink 90 is adjacent an outer surface of the inner sidewall 10I with one or more fins 92 (e.g., a plurality of fins 92) extending into the chamber 34I so that the fin(s) 92 are exposed to the airflow through the chamber 34I. The heat sink 90 can facilitate the removal of heat from the inner sidewall 10I and therefore from the chamber 15I that holds the liquid.

The outer sidewall 30I can optionally be a single wall, and can optionally be made of a thermally insulative material (e.g., a plastic material, a foam material, etc.). In other embodiments, the outer sidewall 30I can optionally define a chamber therein (e.g., be defined by two walls) that can contain air, or can be a vacuum chamber, to provide thermal insulation to the outer sidewall 30I relative to the inner sidewall 10I and liquid in the chamber 15I.

In FIG. 10, the heating element is excluded to show the inner bottom wall 12I of the container 100I. Though the heating element is excluded from FIG. 10, one of skill in the art will recognize that the container 100I can have a heating element like the heating element 40, 40A, 40B, 40C or 40D previously described (e.g., a heating element disposed above the inner bottom wall 12I or disposed below the inner bottom wall 12I, or disposed in thermal communication with at least a portion of the inner sidewall 12I; a resistive heater or Peltier element; a screen printed heating element printed on the inner bottom wall 12I, etc.).

Figure 11:
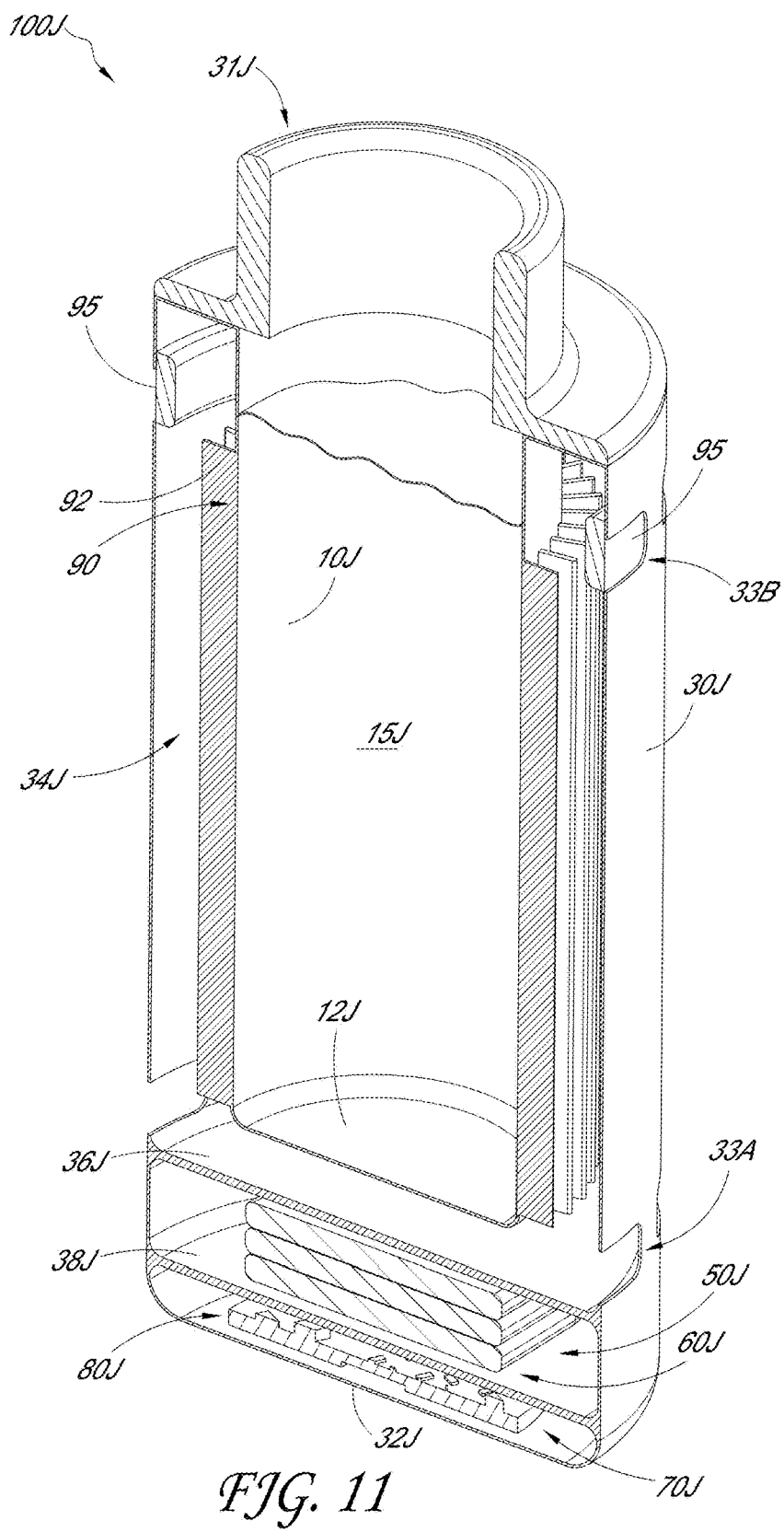
FIG. 11 is a perspective cross-sectional view of an embodiment of a drinkware container.

FIG. 11 illustrates an embodiment of a drinkware container 100J (hereinafter "container 100J"). The container 100J is similar to the container 100, 100I shown in FIGS. 1 and 10, except as noted below. Thus, the reference numerals used to designate the various components of the container 100J are identical to those used for identifying the corresponding components of the container 100 in FIG. 1 and the container 100I in FIG. 10, except that the letter "J" has been added to the reference numerals of the container 100J. Therefore the description for the various components of the container 100 shown in FIG. 1, and of the container 100I shown in FIG. 10, are understood to apply to the corresponding components of the container 100J in FIG. 11, except as described below. The container 100J excludes the use of a phase change material (PCM) and chamber where the PCM is contained.

The container 100J differs from the container 100I in that one or more of the one or more proximal or distal openings 33a, 33b are selectively closed to inhibit or cease the chimney effect of airflow through the chamber 34J, as described above in connection with the container 100I. In the illustrated embodiment, the one or more proximal openings 33b are selectively closed with one or more gates 95a to prevent airflow through the openings 33b, thereby ceasing the chimney airflow effect through the chamber 34J. Though only the one or more gates 95a are shown that selectively close the one or more proximal openings 33b, one of skill in the art will understand that alternatively, or additionally, gates can be actuated to selectively close the one or more distal openings 33b in the outer sidewall 30J.

The one or more gates 95a can be actuated mechanically or electrically. In one embodiment, the one or more gates 95a can be manually slid to cover or close the one or more proximal openings 33b. For example, a user can push a slide button or lever on a surface of the container 100J that is mechanically coupled to the one or more gates 95a, where actuation of the push button or lever by the user slides the one or more gates 95a to cover or uncover the one or more proximal openings 33b.

In another embodiment, the one or more gates 95a can be driven by an electrical actuator (e.g., electric motor, solenoid, electromagnet, etc.), which can be powered by the one or more power storage elements 60J and/or controlled by the control circuitry 80J, and which can be actuated by a user pushing on a user interface (e.g., button) on a surface of the container 100J.

In another embodiment, the one or more gates 95a can be automatically driven by the electrical actuator. For example, the control circuitry 80J can have a receiver that receives commands from a remote mobile phone or tablet computer, and can actuate the one or more gates 95a to selectively close or open the one or more proximal openings 33a. In still another embodiment, the control circuitry 80J can optionally actuate the one or more gates 95a to selectively open or close the one or more proximal openings 33a based at least in part on a sensed parameter during use of the container 100J. For example, the control circuitry 80J can actuate the one or more gates 95a to close the one or more proximal openings 33a based on sensed temperature information for the liquid in the chamber 15G to inhibit further cooling of the liquid 15G. In another embodiment, the control circuitry 80J can actuate the one or more gates 95a to close the one or more proximal openings 33a based on a sensed energy level of the one or more power storage elements 60J to conserve energy as closing the one or more proximal openings 33a will result in a decreased loss of heat from the liquid in the chamber 15J, which will therefore require less energy input from a heating element of the container 100J to maintain the liquid in the chamber 15J at a predetermined or user selected temperature, thereby reducing the power demand and increasing the operating life of the one or more power storage elements 60J.

Figure 12:
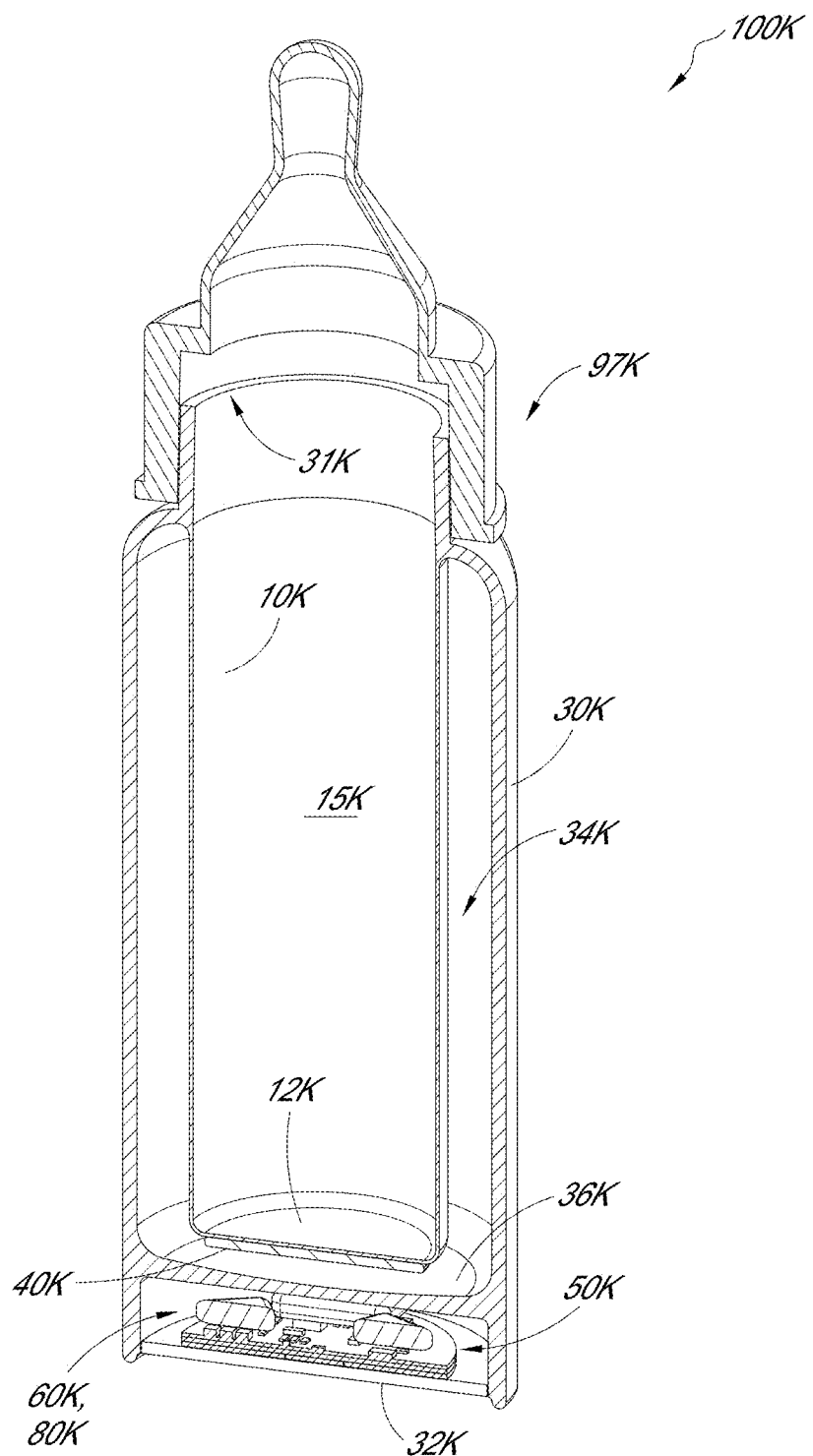
FIG. 12 is a perspective cross-sectional view of another embodiment of a drinkware container.

FIG. 12 illustrates an embodiment of a drinkware container 100K (hereinafter "container 100K"). In the illustrated embodiment, the drinkware container 100K is in the form of a baby or infant bottle. Some of the features of the container 100K are similar to features in the container 100 in FIG. 1. Thus, references numerals used to designate the various components of the container 100K are identical to those used for identifying the corresponding components of the container 100 in FIG. 1, except that the letter "K" has been added to the reference numerals of the container 100K. Therefore, the description for the various components of the container 100 in FIG. 1 is understood to apply to the corresponding components of the container 100K in FIG. 12, except as described below.

As only a cross-section is shown, the other half of the drinkware container 100K is excluded in FIG. 12 to illustrate the various components of the container 100K. One of skill in the art will understand that the excluded portion of the drinkware container 100K in FIG. 12 is a mirror image of the portion of the drinkware container 100K that is shown in FIG. 12.

As shown in FIG. 12, a connector 97K attaches to a proximal end of the container 100K so that it covers the lip 31K. In the illustrated embodiment, the connector 97K can optionally include a nipple. The nipple can be of a flexible material (e.g., rubber) such as those used in baby bottles, or can be or a relatively rigid material (e.g., plastic) such as those used in sippy cups.

The container 100K has an inner sidewall 10K and inner bottom wall 12K that together define a chamber 15K that receives and holds a liquid (e.g., milk) therein. The container 100K also has an outer sidewall 30K that circumferentially surrounds and is radially spaced apart from the inner sidewall 10K so as to define an annular chamber 34K therebetween. The annular chamber 34K can optionally extend below the inner bottom wall 12K so that there is a gap between the inner bottom wall 12K and a bottom plate 36K. The annular chamber 34K can optionally be filled with air, which can facilitate thermal insulation of the outer sidewall 30K of the container 100K relative to the inner sidewall 10K and liquid in the chamber 15K. In another embodiment, the annular chamber 34K can optionally be under vacuum to provide a vacuum chamber that facilitates thermal insulation of the outer sidewall 30K of the container 100K relative to the inner sidewall 10K and liquid in the chamber 15K. In still another embodiment, the annular chamber 34K can be filled with a material (e.g., insulative material, such as foam, that can facilitate thermal insulation of the outer sidewall 30K of the container 100K relative to the inner sidewall 10K and liquid in the chamber 15K. In one embodiment, the outer sidewall 30K can optionally be of a different material than the material of the inner sidewall 10K. In another embodiment, the inner sidewall 10K and outer sidewall 30K can be made of the same material (e.g., glass, a plastic material, a metal).

A chamber 50K can be defined between the bottom plate 36K and a second bottom plate 32K, where the chamber 50K can optionally removably house one or both of one or more power storage elements 60K and control circuitry 80K therein.

The container 100K can have a heating element 40K optionally disposed below (e.g., in contact with a bottom surface of) the inner bottom wall 12K that covers at least a portion of the bottom surface of the inner bottom wall 12K so that the heating element 40K is in thermal communication (e.g., indirect thermal communication) with liquid in the chamber 15K via conduction heat transfer through the inner bottom wall 12K. The heating element 40K is optionally a resistive heater. In other embodiments, the heating element 40K can optionally be a thermoelectric element (e.g., Peltier element). In some embodiments, as discussed above, the heating element 40K can be defined by a trace pattern screen printed onto at least a portion of the bottom surface of the inner bottom wall 12K. A lead line (not shown) can extend from the heating element 40K to one or both of the one or more power storage elements 60K and control circuitry 80K, as discussed above in connection with the container 100 of FIG. 1. Though the embodiment in FIG. 12 shows the heating element 40K disposed below the inner bottom wall 12K, in other embodiments the heating element 40K can be disposed above the inner bottom wall 12K, similar to the heating element 40 shown in FIG. 1, so that it is in thermal communication (e.g., direct thermal communication) with liquid in the chamber 15K.

The control circuitry 80K can control the operation of the heating element 40K to control the amount of energy supplied to the liquid in the chamber 15K to maintain or increase the temperature of the liquid. Optionally, the control circuitry 80K can control delivery of power to the heating element 40K based at least in part on information from one or more sensors that sense a parameter of quality of the liquid (e.g., temperature, volume, acidity, pH) where said one or more sensors can be on a surface of one or both of the inner sidewall 10K and inner bottom wall 12K.

The control circuitry can include a memory that stores or receives one or more algorithms that can be executed by the control circuitry 80K to control the operation of the heating element 40K and/or to determine a parameter of the liquid based on sensed information. In one embodiment, such algorithms can be used to determine one or more parameters of the liquid in the container 100K based on sensed information for another parameter of the liquid. In one embodiment, the container 100K can include a sensor in communication with the chamber 15K (e.g., in contact with the inner sidewall 10K or inner bottom wall 12K, whose sensed information can provide an indication of a temperature of the liquid in the container 100K, and an algorithm can calculate a volume of the liquid in the chamber 15K based on the sensed information of the same sensor. For example, by sensing how long it takes for the liquid to change temperature upon actuation of the heating element 40K, the algorithm can calculate the approximate volume of liquid in the chamber 15K (e.g., if the container 100K is full of liquid, it may take X seconds for the sensed temperature to change, but if the container 100K is half-full of liquid, it may take Y seconds for the sensed temperature to change). Though such algorithms are described in connection with the container 100K, one of skill in the art will recognize that such algorithms can be implemented or use by the control circuitry 80-80J, 80L, 80N, 80P-80R of the other containers 100-100J, 100L, 100M, 100N, 100P-100R disclosed herein.

Figure 13:
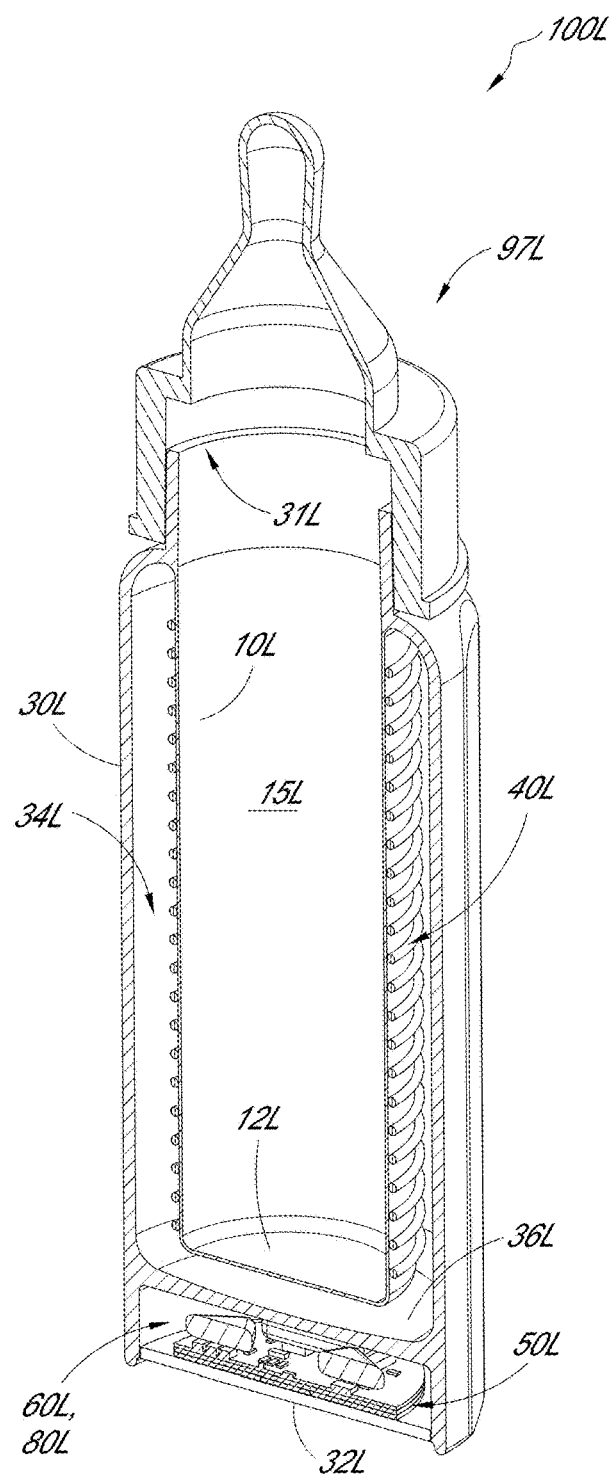
FIG. 13 is a perspective cross-sectional view of another embodiment of a drinkware container.

FIG. 13 illustrates an embodiment of a drinkware container 100L (hereinafter "container 100L"). The container 100L is similar to the container 100K shown in FIG. 12, except as noted below. Thus, the reference numerals used to designate the various components of the container 100L are identical to those used for identifying the corresponding components of the container 100K in FIG. 12, except that the letter "L" has replaced the letter "K" in the reference numerals of the container 100K. Therefore the description for the various components of the container 100K shown in FIG. 12 are understood to apply to the corresponding components of the container 100L in FIG. 13, except as described below.

As only a cross-section is shown, the other half of the drinkware container 100L is excluded in FIG. 13 to illustrate the various components of the container 100L. One of skill in the art will understand that the excluded portion of the drinkware container 100L in FIG. 13 is a mirror image of the portion of the drinkware container 100L that is shown in FIG. 13.

As shown in FIG. 13, the heating element 40L optionally surrounds at least a portion of the inner sidewall 10L (e.g., surrounds the inner sidewall 10L along substantially its entire length). The heating element 40L can optionally be a resistive heater, such as a coil heater. In another embodiment, the heating element 40L can be a thermoelectric element (e.g., Peltier element).

Figure 14:
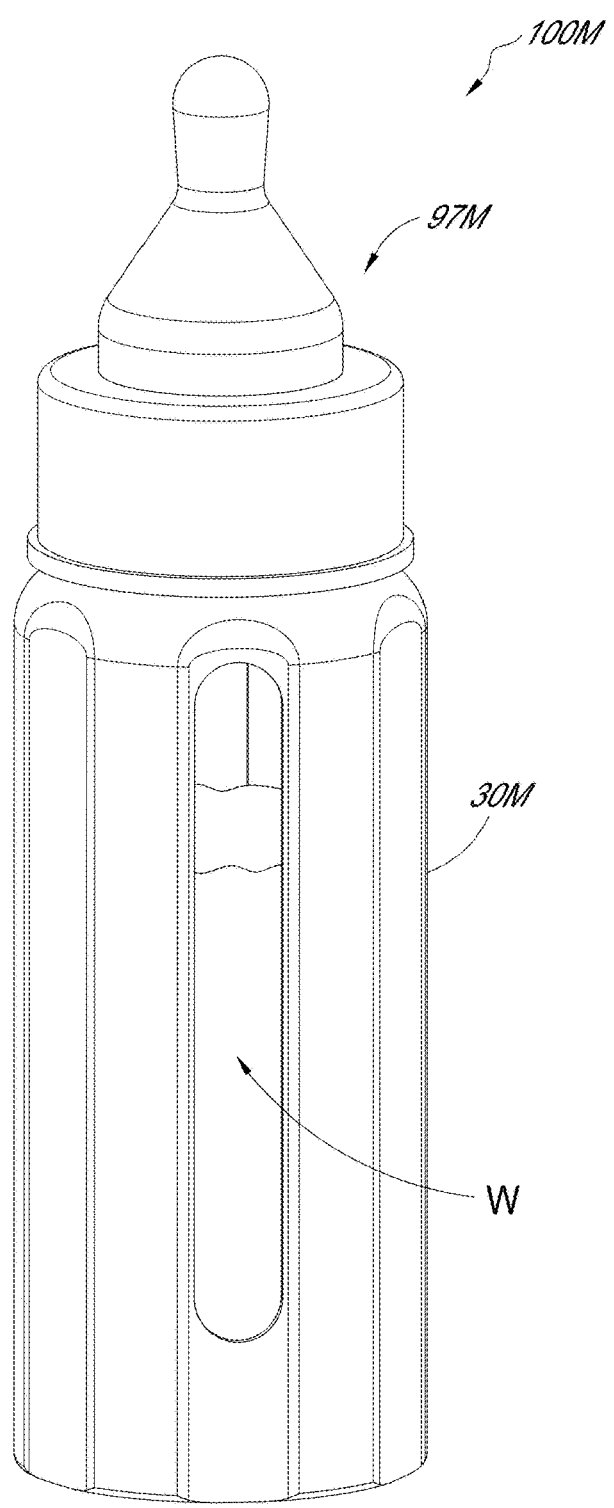
FIG. 14 is a perspective partial view of another embodiment of a drinkware container.

FIG. 14 illustrates an embodiment of a drinkware container 100M (hereinafter "container 100M"). The container 100M can be similar to the container 100K, 100L shown in FIGS. 12-13, except as noted below. Thus, the reference numerals used to designate the various components of the container 100M are identical to those used for identifying the corresponding components of the container 100K, 100L in FIGS. 12-13, except that the letter "M" has replaced the letter "K" or "L" in the reference numerals of the container 100K, 100L. Therefore the description for the various components of the container 100K, 100L shown in FIGS. 12-13 are understood to apply to the corresponding components of the container 100M in FIG. 14, except as described below.

As shown in FIG. 14, the container 100M optionally has one or more viewing windows W on the outer sidewall 30M that allow viewing of the liquid in the container 100M (e.g., to see the level of the liquid in the container 100M). Though such one or more viewing windows W are shown in connection with container 100M, one of skill in the art will recognize that such one or more viewing windows W can be incorporated into the other containers 100-100L, 100N, 100P-100R disclosed herein.

Figure 15:
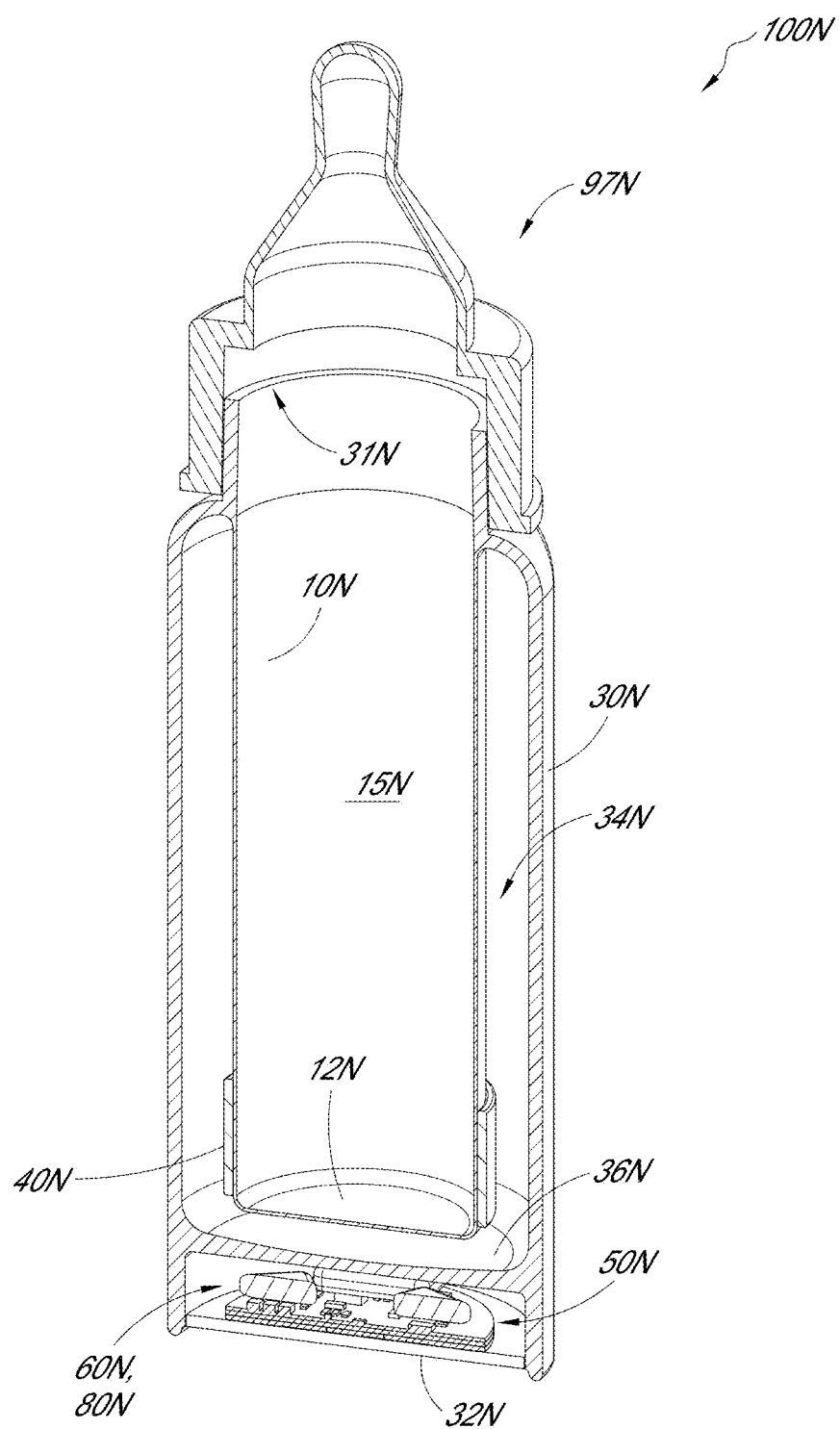
FIG. 15 is a perspective cross-sectional view of another embodiment of a drinkware container.

FIG. 15 illustrates an embodiment of a drinkware container 100N (hereinafter "container 100N"). The container 100N is similar to the container 100K shown in FIG. 12, except as noted below. Thus, the reference numerals used to designate the various components of the container 100N are identical to those used for identifying the corresponding components of the container 100K in FIG. 12, except that the letter "N" has replaced the letter "K" in the reference numerals of the container 100K. Therefore the description for the various components of the container 100K shown in FIG. 12 are understood to apply to the corresponding components of the container 100N in FIG. 15, except as described below.

As only a cross-section is shown, the other half of the drinkware container 100N is excluded in FIG. 15 to illustrate the various components of the container 100N. One of skill in the art will understand that the excluded portion of the drinkware container 100N in FIG. 15 is a mirror image of the portion of the drinkware container 100N that is shown in FIG. 15.

As shown in FIG. 15, the heating element 40N optionally surrounds at least a portion of the inner sidewall 10N (e.g., surrounds the inner sidewall 10N along less than half its length). The heating element 40N can optionally be a resistive heater, such as a coil heater. In another embodiment, the heating element 40N can be a thermoelectric element (e.g., Peltier element). In the illustrated embodiment, the heating element 40N surrounds a bottom portion of the inner sidewall 10N (proximate the bottom inner wall 12N). However, in other embodiments, the heating element 40N can optionally surround the top portion of the inner sidewall 10N, or can optionally surround an intermediate portion of the inner sidewall 10N that is between the bottom and top ends of the inner sidewall 10N.

Figure 16:
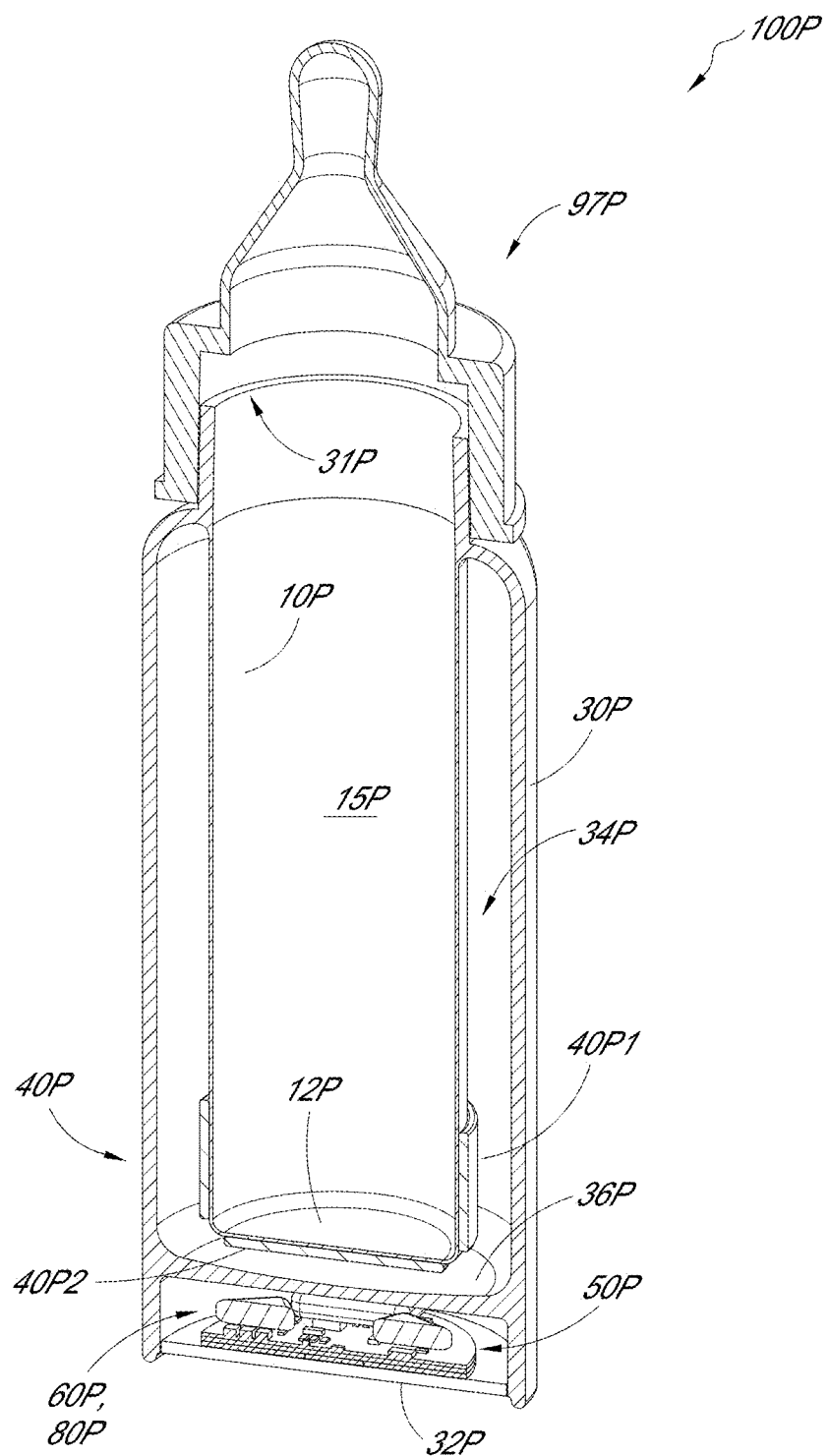
FIG. 16 is a perspective cross-sectional view of another embodiment of a drinkware container.

FIG. 16 illustrates an embodiment of a drinkware container 100P (hereinafter "container 100P"). The container 100P is similar to the container 100K shown in FIG. 12, except as noted below. Thus, the reference numerals used to designate the various components of the container 100P are identical to those used for identifying the corresponding components of the container 100K in FIG. 12, except that the letter "P" has replaced the letter "K" in the reference numerals of the container 100K. Therefore the description for the various components of the container 100K shown in FIG. 12 are understood to apply to the corresponding components of the container 100P in FIG. 16, except as described below.

As only a cross-section is shown, the other half of the drinkware container 100P is excluded in FIG. 16 to illustrate the various components of the container 100P. One of skill in the art will understand that the excluded portion of the drinkware container 100P in FIG. 16 is a mirror image of the portion of the drinkware container 100P that is shown in FIG. 16.

As shown in FIG. 16, the heating element 40P includes a bottom heating element 40P1 optionally disposed below (e.g., in contact with a bottom surface of) the inner bottom wall 12P that covers at least a portion of the bottom surface of the inner bottom wall 12P so that the heating element 40P1 is in thermal communication (e.g., indirect thermal communication) with liquid in the chamber 15P via conduction heat transfer through the inner bottom wall 12P. The heating element 40P also includes a side heating element 40P2 that optionally surrounds at least a portion of the inner sidewall 10P (e.g., surrounds the inner sidewall 10P along less than half its length). One or both of the bottom and side heating elements 40P1, 40P2 can optionally be a resistive heater, such as a coil heater. In another embodiment, one or both of the bottom and side heating elements 40P1, 40P2 can be a thermoelectric element (e.g., Peltier element). In the illustrated embodiment, the side heating element 40P2 surrounds a bottom portion of the inner sidewall 10P (proximate the bottom inner wall 12P). However, in other embodiments, the heating element 40P can optionally surround the top portion of the inner sidewall 10P, or can optionally surround an intermediate portion of the inner sidewall 10P that is between the bottom and top ends of the inner sidewall 10P.

Figure 17:
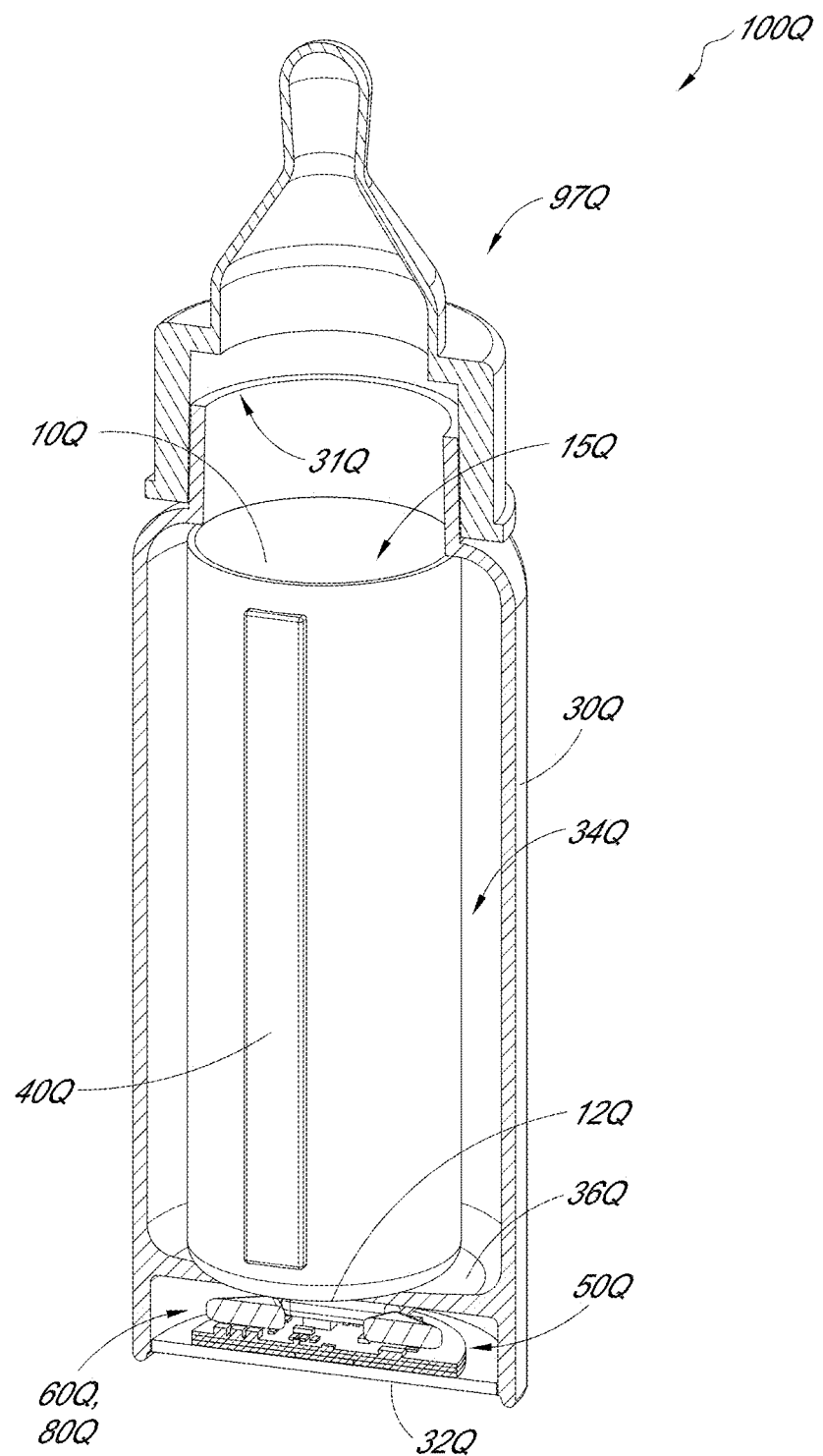
FIG. 17 is a perspective cross-sectional view of another embodiment of a drinkware container.

FIG. 17 illustrates an embodiment of a drinkware container 100Q (hereinafter "container 100Q"). The container 100Q is similar to the container 100K shown in FIG. 12, except as noted below. Thus, the reference numerals used to designate the various components of the container 100Q are identical to those used for identifying the corresponding components of the container 100K in FIG. 12, except that the letter "Q" has replaced the letter "K" in the reference numerals of the container 100K. Therefore the description for the various components of the container 100K shown in FIG. 12 are understood to apply to the corresponding components of the container 100Q in FIG. 17, except as described below.

FIG. 17 shows a cross-section of the outer sidewall 30Q and connector 97Q, as well as a cross-section of the chamber 50Q, wall 32Q and one or more power storage elements 60Q and control circuitry 80Q. The other half of these components is excluded in FIG. 17 to illustrate the various components of the container 100Q. One of skill in the art will understand that the excluded portion of the drinkware container 100Q in FIG. 17 is a mirror image of the portion of the drinkware container 100Q that is shown in FIG. 17.

As shown in FIG. 17, the heating element 40Q can optionally be a band that extends along at least a portion of the length of the sidewall 10Q (e.g., along substantially the entire length of the inner sidewall 10Q). The heating element 40Q can have a width that is less than a circumference of the sidewall 10Q, such that the heating element 40Q only extends over a portion of the circumference of the inner sidewall 10Q. The heating element 40Q can optionally be a resistive heater. In another embodiment, the heating element 40Q can be a thermoelectric element (e.g., Peltier element). In the illustrated embodiment, the heating element 40Q optionally extends along substantially the entire length of the inner sidewall 10Q. In another embodiment, the heating element 40Q can optionally extend over only a portion (e.g., less than half, less than 1/3) of the length of the inner sidewall 10Q.

Figure 18:
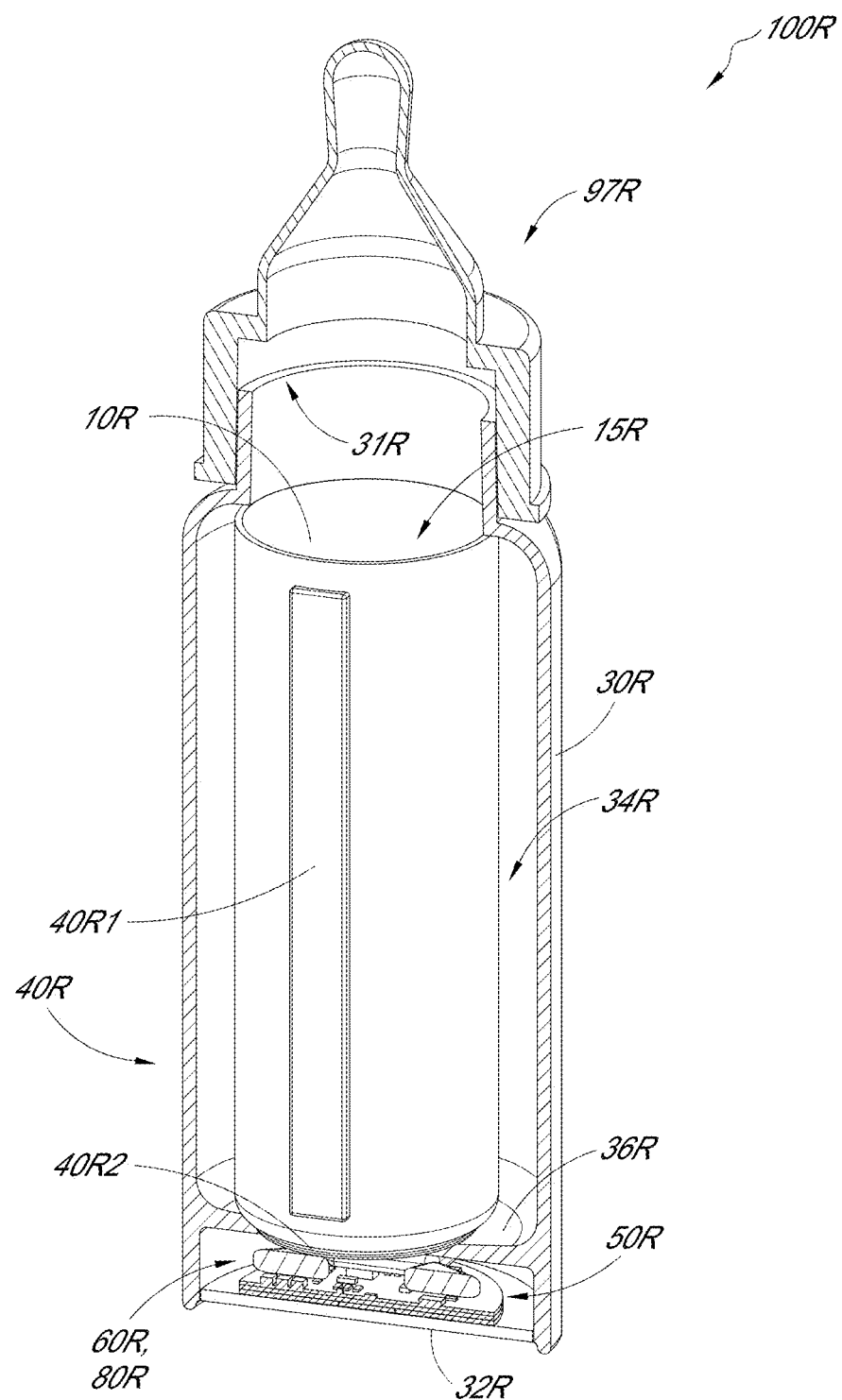
FIG. 18 is a perspective cross-sectional view of another embodiment of a drinkware container.

FIG. 18 illustrates an embodiment of a drinkware container 100R (hereinafter "container 100R"). The container 100R is similar to the container 100K shown in FIG. 12, except as noted below. Thus, the reference numerals used to designate the various components of the container 100R are identical to those used for identifying the corresponding components of the container 100K in FIG. 12, except that the letter "R" has replaced the letter "K" in the reference numerals of the container 100K. Therefore the description for the various components of the container 100K shown in FIG. 12 are understood to apply to the corresponding components of the container 100R in FIG. 18, except as described below.

FIG. 18 shows a cross-section of the outer sidewall 30R and connector 97R, as well as a cross-section of the chamber 50R, wall 32R and one or more power storage elements 60R and control circuitry 80R. The other half of these components is excluded in FIG. 18 to illustrate the various components of the container 100R. One of skill in the art will understand that the excluded portion of the drinkware container 100R in FIG. 18 is a mirror image of the portion of the drinkware container 100R that is shown in FIG. 18.

As shown in FIG. 18, the heating element 40R includes a bottom heating element 40R1 optionally disposed below (e.g., in contact with a bottom surface of) the inner bottom wall 12R that covers at least a portion of the bottom surface of the inner bottom wall 12R so that the heating element 40R1 is in thermal communication (e.g., indirect thermal communication) with liquid in the chamber 15R via conduction heat transfer through the inner bottom wall 12R. The heating element 40R also includes a side heating element 40R2 that can optionally be a band that extends along at least a portion of the length of the sidewall 10R (e.g., along substantially the entire length of the inner sidewall 10R). The heating element 40R can have a width that is less than a circumference of the sidewall 10R, such that the heating element 40R only extends over a portion of the circumference of the inner sidewall 10R. One or both of the bottom and side heating elements 40R1, 40R2 can optionally be a resistive heater, such as a coil heater. In another embodiment, one or both of the bottom and side heating elements 40R1, 40R2 can be a thermoelectric element (e.g., Peltier element). In the illustrated embodiment, the side heating element 40R2 optionally extends along substantially the entire length of the inner sidewall 10R. In another embodiment, the side heating element 40R2 can optionally extend over only a portion (e.g., less than half, less than ⅓) of the length of the inner sidewall 10R.

Figure 19:
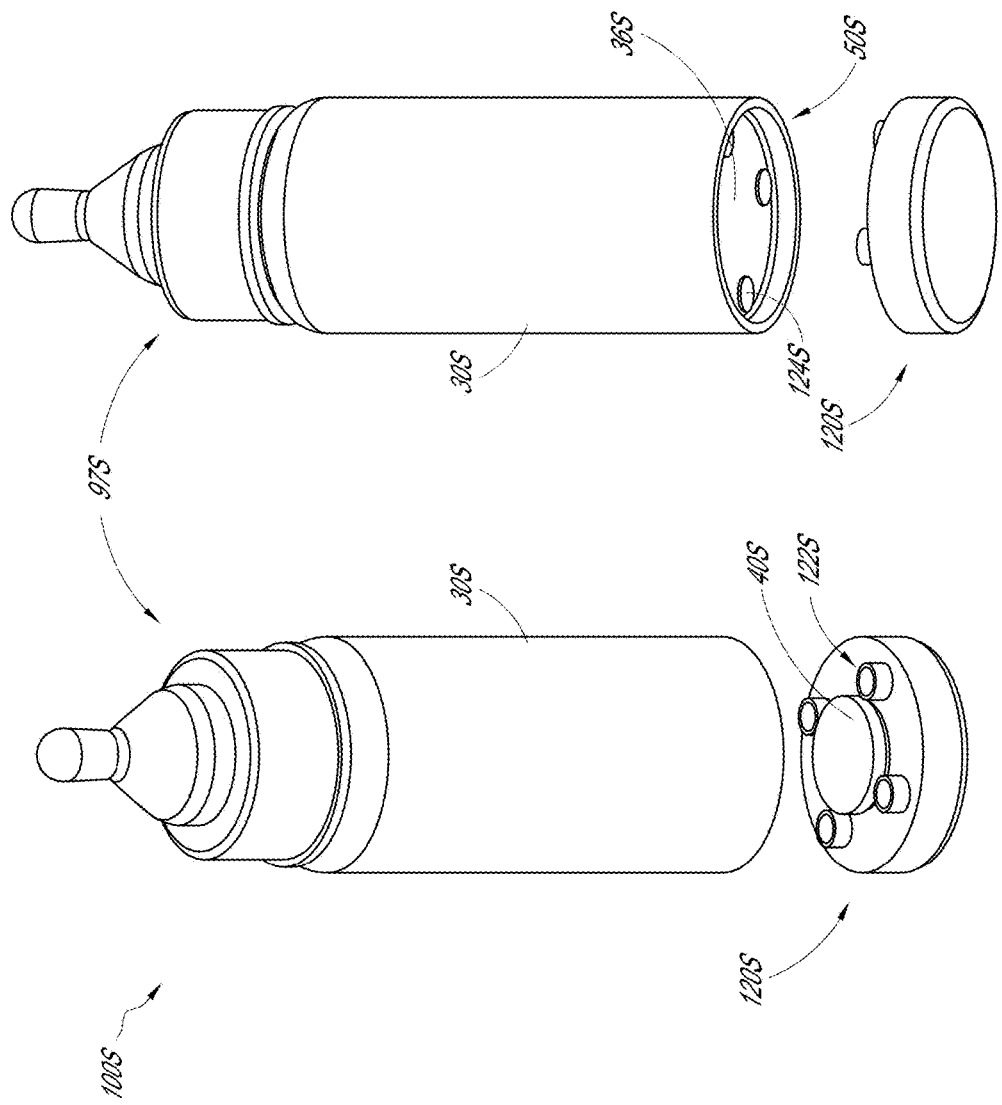
FIGS. 19A-19B show a perspective view of another embodiment of a drinkware container.

FIGS. 19A-19B illustrate an embodiment of a drinkware container 100S (hereinafter "container 100S"). In the illustrated embodiment, the drinkware container 100S is in the form of a baby or infant bottle. Some of the features of the container 100S are similar to features in the container 100K in FIG. 12. Thus, references numerals used to designate the various components of the container 100S are identical to those used for identifying the corresponding components of the container 100K in FIG. 12, except that the letter "S" has replaced the letter "K" in the reference numerals of the container 100S. Therefore, the structure and description for the various components of the container 100K in FIG. 12 is understood to apply to the corresponding components of the container 100S in FIGS. 19A-19B, except as described below.

As shown in FIGS. 19A-19B, a connector 97S attaches to a proximal end of the container 100S so that it covers a lip (not shown, but similar to 31K in FIG. 12). In the illustrated embodiment, the connector 97S can optionally include a nipple. The nipple can be of a flexible material (e.g., rubber) such as those used in baby bottles, or can be or a relatively rigid material (e.g., plastic) such as those used in sippy cups.

The container 100S an outer sidewall 30S and a chamber 50S at a bottom of the container 100S and defined at least in part by a bottom surface 36S of the container 100S.

With continued reference to FIGS. 19A-19B, a module 120S can optionally include one or more of heating elements 40S (similar to heating element 40K), one or more power storage element (not shown, but similar to power storage element 60K) and/or control circuitry (not shown, but similar to control circuitry 80K). The module 120S can removably couple to the bottom portion of the container 100S so that the one or more heating elements 40S is in contact with the bottom surface 36S. In another embodiment, the one or more heating elements can be incorporated into the container 100S (as disclosed in other embodiments herein), and power to the one or more heating elements can be communicated from the module 120S via one or more electrical contacts between the container 100S and the module 120S.

The module 120S can have one or more magnets 122S configured to magnetically couple to one or more magnets 124S on the bottom surface 36S to couple the module 120S to the container 100S. Once the user is done using the module 120S (e.g., to heat a liquid in the container 100S), the user can decouple the module 120S from the container 100S (e.g., to allow the container 100S to be washed).

Advantageously, because the module 120S is removable, it can be used with a plurality of separate containers 100S. Thus, a user can use one module 120S to heat a plurality of separate containers 100S and need not purchase a plurality of containers that each includes its separate electronics and heating unit.

Figure 20:
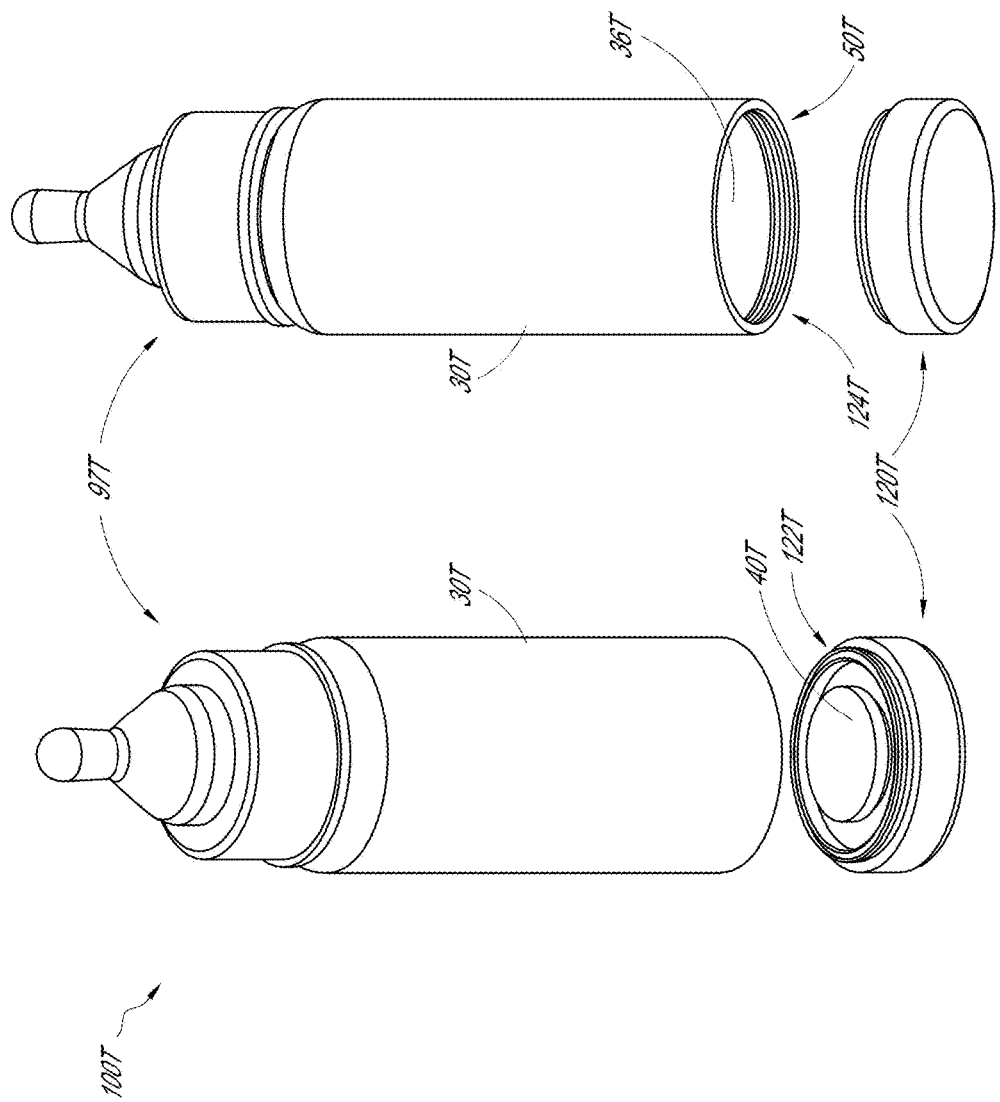
FIGS. 20A-20B show a perspective view of another embodiment of a drinkware container.

FIGS. 20A-20B illustrate an embodiment of a drinkware container 100T (hereinafter "container 100T"). In the illustrated embodiment, the drinkware container 100T is in the form of a baby or infant bottle. Some of the features of the container 100T are similar to features in the container 100K in FIG. 12. Thus, references numerals used to designate the various components of the container 100T are identical to those used for identifying the corresponding components of the container 100K in FIG. 12, except that the letter "T" has replaced the letter "K" in the reference numerals of the container 100T. Therefore, the structure and description for the various components of the container 100K in FIG. 12 is understood to apply to the corresponding components of the container 100T in FIGS. 20A-20B, except as described below.

As shown in FIGS. 20A-20B, a connector 97T attaches to a proximal end of the container 100T so that it covers a lip (not shown, but similar to 31K in FIG. 12). In the illustrated embodiment, the connector 97T can optionally include a nipple. The nipple can be of a flexible material (e.g., rubber) such as those used in baby bottles, or can be or a relatively rigid material (e.g., plastic) such as those used in sippy cups.

The container 100T an outer sidewall 30T and a chamber 50T at a bottom of the container 100T and defined at least in part by a bottom surface 36T of the container 100T.

With continued reference to FIGS. 20A-20B, a module 120T can optionally include one or more of heating elements 40T (similar to heating element 40K), one or more power storage element (not shown, but similar to power storage element 60K) and/or control circuitry (not shown, but similar to control circuitry 80K). The module 120T can removably couple to the bottom portion of the container 100T so that the one or more heating elements 40T is in contact with the bottom surface 36T. In another embodiment, the one or more heating elements can be incorporated into the container 100T (as disclosed in other embodiments herein), and power to the one or more heating elements can be communicated from the module 120T via one or more electrical contacts between the container 100T and the module 120T.

The module 120T can have a threaded portion 122T configured to threadably couple to a threaded portion 124T on a bottom of the container 100T to couple the module 120T to the container 100T. Once the user is done using the module 120T (e.g., to heat a liquid in the container 100T), the user can decouple the module 120T from the container 100T (e.g., to allow the container 100T to be washed).

Advantageously, because the module 120T is removable, it can be used with a plurality of separate containers 100T. Thus, a user can use one module 120T to heat a plurality of separate containers 100T and need not purchase a plurality of containers that each includes its separate electronics and heating unit.

Figure 21:
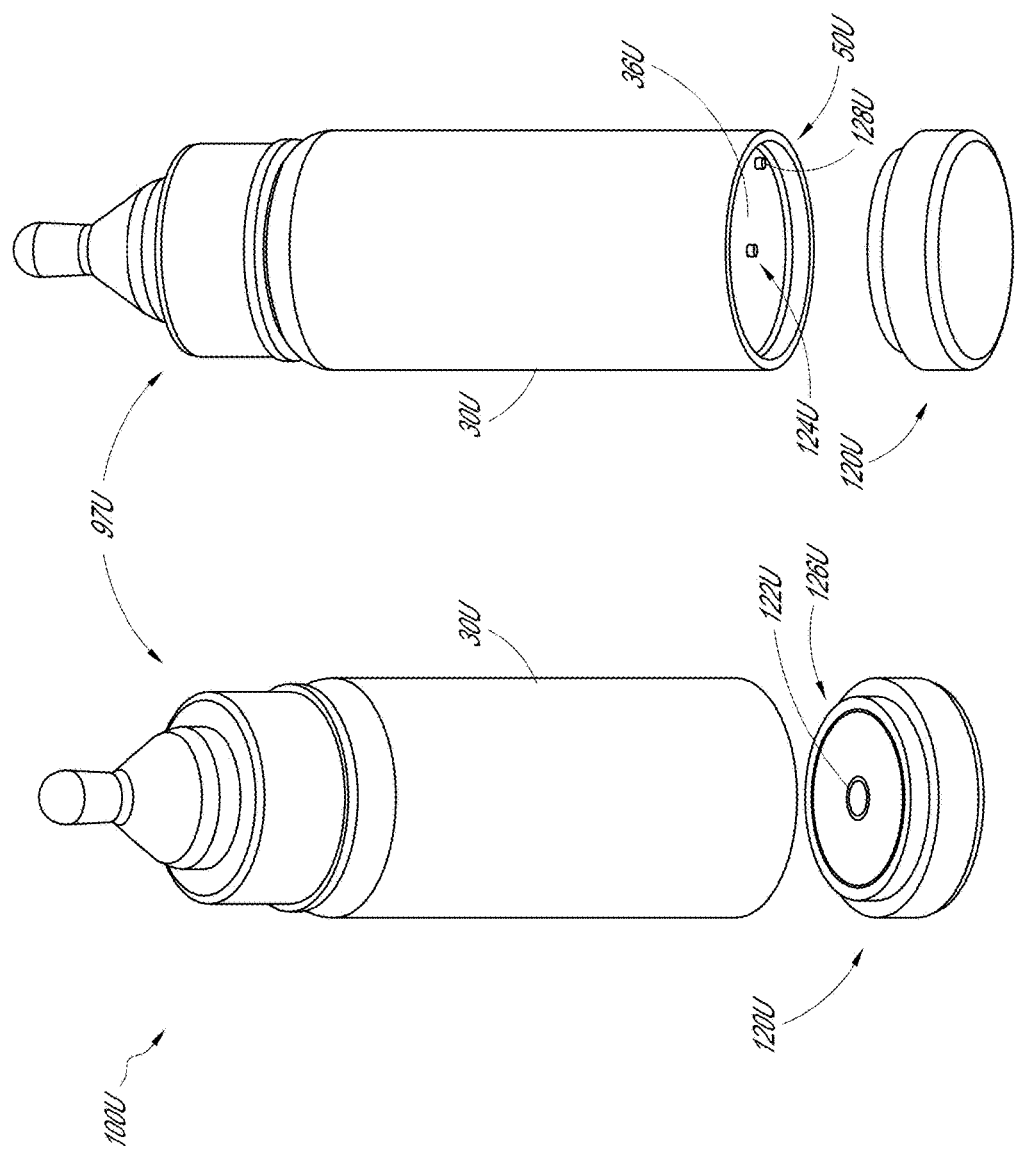
FIGS. 21A-21B show a perspective view of another embodiment of a drinkware container.

FIGS. 21A-21B illustrate an embodiment of a drinkware container 100U (hereinafter "container 100U"). In the illustrated embodiment, the drinkware container 100U is in the form of a baby or infant bottle. Some of the features of the container 100U are similar to features in the container 100K in FIG. 12. Thus, references numerals used to designate the various components of the container 100U are identical to those used for identifying the corresponding components of the container 100K in FIG. 12, except that the letter "U" has replaced the letter "K" in the reference numerals of the container 100U. Therefore, the structure and description for the various components of the container 100K in FIG. 12 is understood to apply to the corresponding components of the container 100U in FIGS. 21A-21B, except as described below.

As shown in FIGS. 21A-21B, a connector 97U attaches to a proximal end of the container 100U so that it covers a lip (not shown, but similar to 31K in FIG. 12). In the illustrated embodiment, the connector 97U can optionally include a nipple. The nipple can be of a flexible material (e.g., rubber) such as those used in baby bottles, or can be or a relatively rigid material (e.g., plastic) such as those used in sippy cups.

The container 100U an outer sidewall 30U and a chamber 50U at a bottom of the container 100U and defined at least in part by a bottom surface 36U of the container 100U.

With continued reference to FIGS. 21A-21B, a module 120U can optionally include one or more of heating elements (similar to heating element 40K), one or more power storage element (not shown, but similar to power storage element 60K) and/or control circuitry (not shown, but similar to control circuitry 80K). The module 120U can removably couple to the bottom portion of the container 100U in a press-fit manner so that the one or more heating elements of the module 120U contact the bottom surface 36U. In another embodiment, the one or more heating elements can be incorporated into the container 100U (as disclosed in other embodiments herein), and power to the one or more heating elements can be communicated from the module 120U via one or more electrical contacts 122U that contact electrical contacts 124U of the container 100U. Additionally, power can be provided to one or more sensors (e.g., temperature sensors, capacitance sensors, tilt sensors) in the container 100U via an electrical contact 126U in the module 120U that contacts an electrical contact 128U in the container 100U when the module 120U is coupled to the container 100U.

Once the user is done using the module 120U (e.g., to heat a liquid in the container 100U), the user can decouple the module 120U from the container 100U (e.g., to allow the container 100U to be washed).

Advantageously, because the module 120U is removable, it can be used with a plurality of separate containers 100U. Thus, a user can use one module 120U to heat a plurality of separate containers 100U and need not purchase a plurality of containers that each includes its separate electronics and heating unit.

Figure 22:
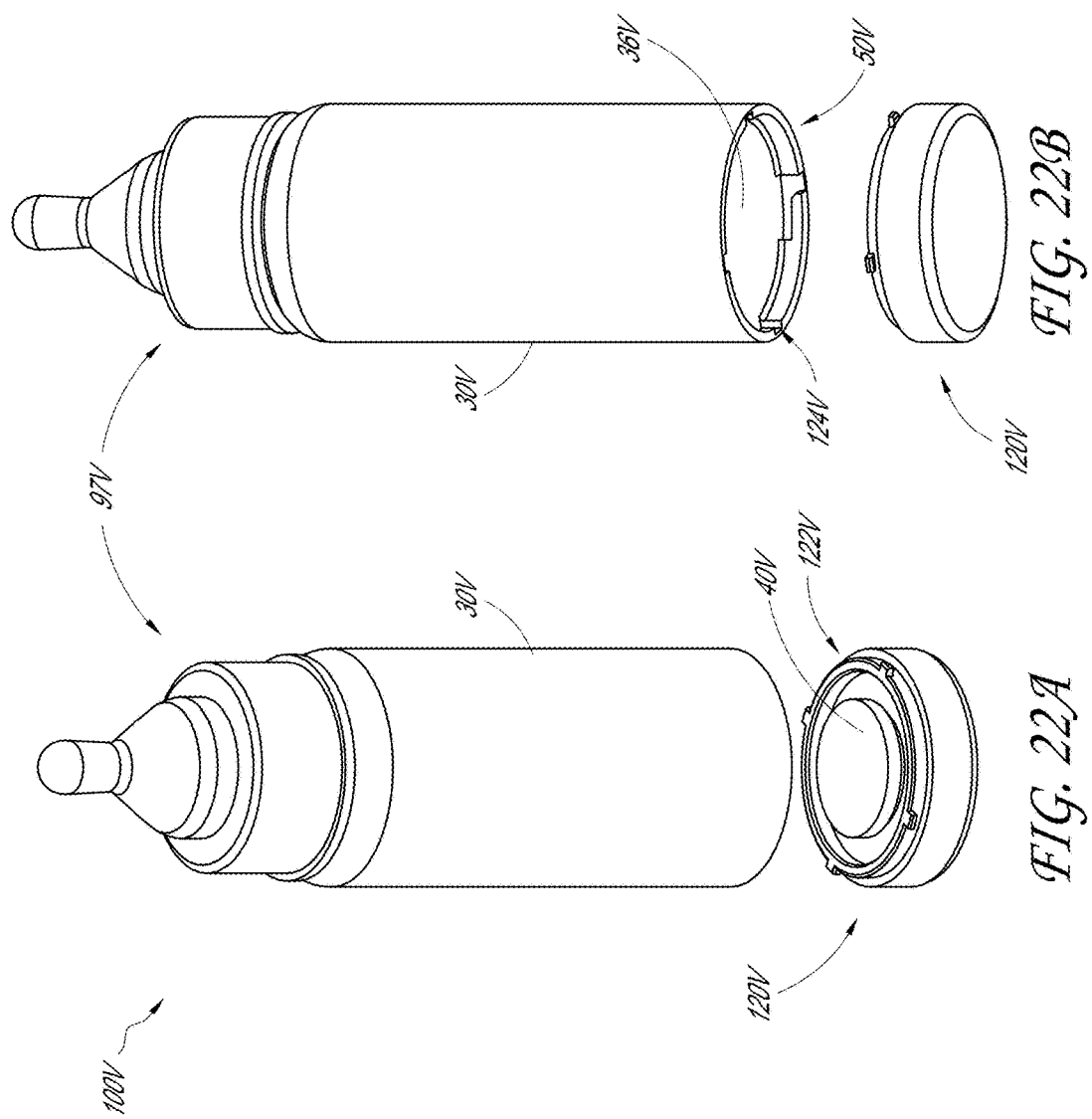
FIGS. 22A-22B show a perspective view of another embodiment of a drinkware container.

FIGS. 22A-22B illustrate an embodiment of a drinkware container 100V (hereinafter "container 100V"). In the illustrated embodiment, the drinkware container 100V is in the form of a baby or infant bottle. Some of the features of the container 100V are similar to features in the container 100K in FIG. 12. Thus, references numerals used to designate the various components of the container 100V are identical to those used for identifying the corresponding components of the container 100K in FIG. 12, except that the letter "V" has replaced the letter "K" in the reference numerals of the container 100V. Therefore, the structure and description for the various components of the container 100K in FIG. 12 is understood to apply to the corresponding components of the container 100V in FIGS. 22A-22B, except as described below.

As shown in FIGS. 22A-22B, a connector 97V attaches to a proximal end of the container 100V so that it covers a lip (not shown, but similar to 31K in FIG. 12). In the illustrated embodiment, the connector 97V can optionally include a nipple. The nipple can be of a flexible material (e.g., rubber) such as those used in baby bottles, or can be or a relatively rigid material (e.g., plastic) such as those used in sippy cups.

The container 100V an outer sidewall 30V and a chamber 50V at a bottom of the container 100V and defined at least in part by a bottom surface 36V of the container 100V.

With continued reference to FIGS. 22A-22B, a module 120V can include one or more of heating elements 40V (similar to heating element 40K), one or more power storage element (not shown, but similar to power storage element 60K) and/or control circuitry (not shown, but similar to control circuitry 80K). The module 120V can removably couple to the bottom portion of the container 100V so that the one or more heating elements 40V is in contact with the bottom surface 36V. In another embodiment, the one or more heating elements can be incorporated into the container 100V (as disclosed in other embodiments herein), and power to the one or more heating elements can be communicated from the module 120V via one or more electrical contacts between the container 100V and the module 120V.

The module 120V can have a pin portion 122V configured to couple to a notched or recessed portion 124V on a bottom of the container 100V to couple the module 120V to the container 100V in a twist-lock manner (e.g., by inserting the module 120V into the chamber 50V and rotating the module 120V, for example a quarter turn, to lock the module 120V to the container 100V). Once the user is done using the module 120V (e.g., to heat a liquid in the container 100V), the user can decouple the module 120V from the container 100V (e.g., to allow the container 100V to be washed).

Advantageously, because the module 120V is removable, it can be used with a plurality of separate containers 100V. Thus, a user can use one module 120V to heat a plurality of separate containers 100V and need not purchase a plurality of containers that each includes its separate electronics and heating unit.

Figure 23:
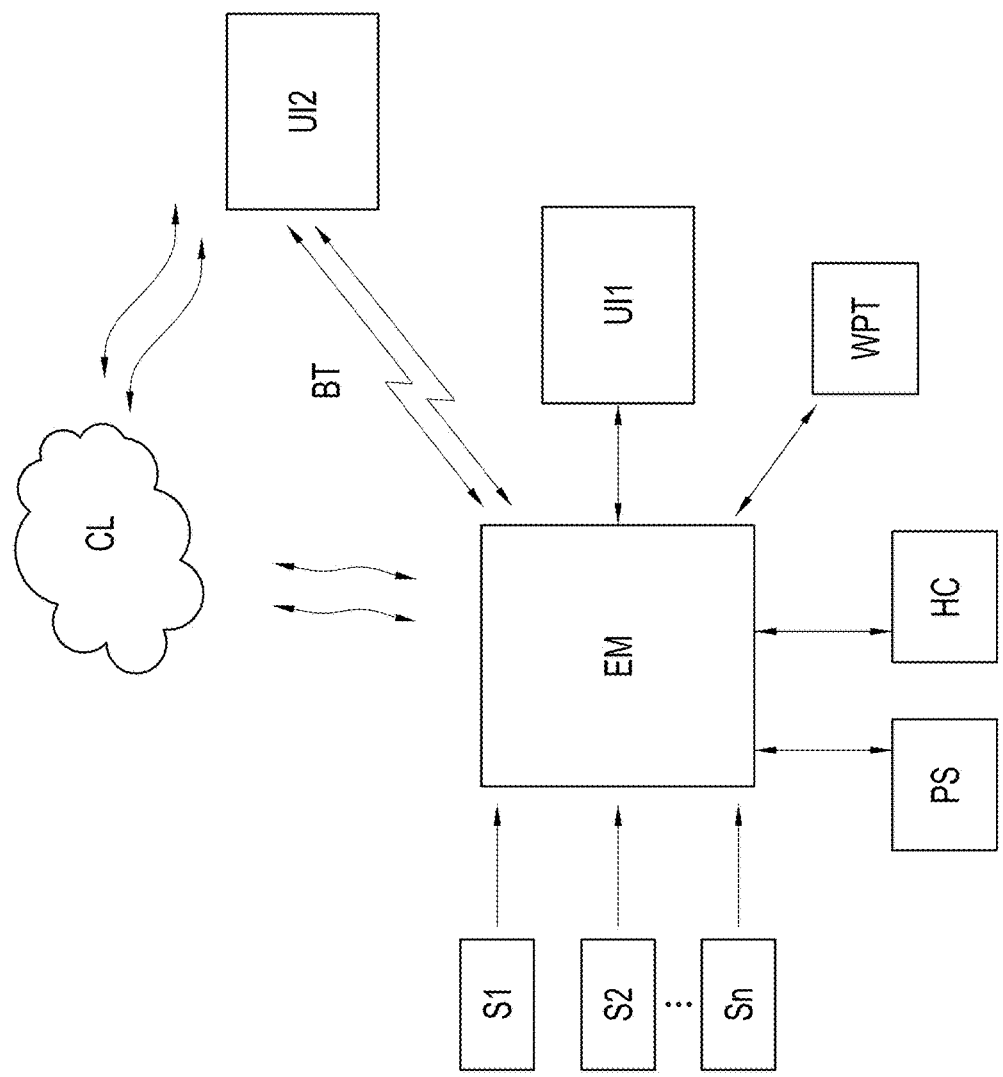
FIG. 23 is a schematic block diagram showing communication between an electronic module in a drinkware container and a user interface thereon and/or on a remote electronic device.

FIG. 23 shows a block diagram of a communication system for any of the drinkware containers described herein. In the illustrated embodiment, the electronic module EM (such as the electronic module disclosed herein for the drinkware containers) can receive sensed information from one or more sensors S1-Sn (e.g., liquid level sensors, liquid volume sensors, temperature sensors, battery charge sensors, capacitance sensors, tilt sensors or gyroscopes). The electronic module EM can also receive information from and transmit information (e.g., instructions) to one or more heating elements HC (e.g., to operate each of the heating elements in a heating mode, turn off, turn on, vary power output of, etc.) and optionally to one or more power storage devices PS (e.g., batteries, such as to charge the batteries or manage the power provided by the batteries to the one or more heating or cooling elements). The electronic module EM can also communicate with a wireless power transmitter WPT (e.g., an inductive power transmitter) on the drinkware container. The electronic module EM can also communicate with (e.g., transmit information to and receive information, such as user instructions from, a user interface UI1 on the unit (e.g., on the body of the drinkware container). The electronic module EM can also communicate with an electronic device ED (e.g., a mobile electronic device such as a mobile phone, PDA, tablet computer, laptop computer, electronic watch; or a desktop computer) via the cloud CL or via a wireless communication system such as Bluetooth BT. The electronic device ED can have a user interface UI2, that can display information associated with the operation of the drinkware container (as disclosed herein), and that can receive information (e.g., instructions) from a user and communicate said information to the drinkware container (as disclosed herein).

The term "electronic module" is meant to refer to electronics generally. Furthermore, the term "electronic module" should not be interpreted to require that the electronics be all in one physical location or connected to one single printed circuit board (PCB). One of skill in the art will recognize that the electronic module or electronics disclosed herein can be in one or more (e.g., plurality) of separate parts (coupled to one or a plurality of PCBs) and/or located in different physical locations of the body of the drinkware container, as disclosed herein. That is, the electronic module or electronics can have different form factors.

Sensors

With respect to any of the containers disclosed above, one or more sensors S1-Sn can be provided. In some embodiments, at least one sensor S2 of the one or more sensors S1-Sn can sense a liquid level (or information indicative of a liquid level) in a chamber (e.g., such as chamber 15 in FIG. 1, etc.) of the container.

In one embodiment, the sensor S2 can be a load cell that can sense a weight of the container (e.g., container 100-100V). The electronic module EM of the container can receive the sensed weight information and compare it against a reference weight data (e.g., previously sensed when the container was empty and/or that is stored in a memory of the electronic module EM), and calculate a volume or level of the liquid in the container (e.g., using an algorithm to convert the sensed weight information to liquid volume or level measurement).

In another embodiment, the sensor S2 can be a pressure sensor on a bottom of the chamber (e.g., chamber 15, 15A, etc.) of the container (e.g., container 100-100V) and can sense a hydrostatic pressure of the liquid in the chamber. The electronic module EM can calculate a liquid volume or level based at least in part on the sensed pressure information from the sensor S2.

In another embodiment, the sensor S2 can be a capacitance sensor (e.g., capacitance sensing strip) that extends along at least a portion of the length of an inner sidewall (e.g., inner sidewall 10, 10A, etc.) that defines the chamber (e.g., chamber 15, 15A, etc.) of the container (e.g., container 100-100V). The sensor S2 can sense a capacitance of a liquid in the container relative to a capacitance of air above the liquid level and communicate the sensed information to the electronic module EM, which can provide a measurement of liquid volume or liquid level in the container based on the sensed information. In another embodiment, the sensor S2 can sense a conductivity of the liquid or air proximate the sensor and the electronic module EM can provide a measurement of liquid level or volume based at least in part on the sensed information.

In another embodiment, the sensor S2 can be an ultrasonic sensor on an inner sidewall (e.g., inner sidewall 10, 10A, etc.) that defines the chamber (e.g., chamber 15, 15A, etc.) of the container (e.g., container 100-100V). The sensor S2 can use a pulse-echo or wall resonance (e.g. resonance of inner sidewall 10, 10A, etc.) to sense information indicative of a liquid level in the container. For example, the sensor S2 can sense a time it takes for pulse emitted by the sensor S2 into the chamber of the container to return to the sensor (e.g., once it bounces from the liquid level location). The sensor S2 can transmit the sensed information to the electronic module EM, which can provide a measurement of liquid volume or liquid level in the container based on the sensed information.

In another embodiment, the sensor S2 can be an accelerometer or tilt sensor. The sensor S2 can sense an orientation (or change in orientation) of the container (e.g., container 100-100V) and communicate the sensed orientation information to the electronic module EM. The electronic module EM can estimate a liquid level in the container based on the sensed orientation information (e.g., using an algorithm that correlates a tilt angle to a liquid level). For example, if the sensor S2 senses an orientation of less than a first threshold (e.g., less than 30 degrees from an upright position) when a user has the container against their lips (e.g., sensed via a sensor on the container lip or lid, such as a contact sensor, temperature sensor, etc.) then the electronic module estimates the liquid level to be about full, and if the sensor S2 senses an orientation greater than a second threshold (e.g., greater than 90 degrees from an upright position) when a user has the container against their lips (e.g., sensed via a sensor on the container lip or lid, such as a contact sensor, temperature sensor, etc.) then the electronic module estimates the liquid level to be about empty, and the electronic module EM can use an algorithm to interpolate between the two thresholds to infer intermediate liquid levels of the container (e.g., half full, quarter full, etc.).

In another embodiment, the sensor S2 can be a light sensor that measures light attenuation through the liquid and provides the sensed information to the electronic module EM, which can provide a measurement of liquid volume or liquid level in the container based on the sensed information (e.g., using an algorithm to correlate light attenuation with liquid volume or level).

In another embodiment, the sensor S2 can be a float that floats on the liquid level in the chamber (e.g., chamber 15, 15A, etc.) of the container (e.g., container 100-100V) and communicates the sensed position information to the electronic module EM, which can provide a measurement of liquid volume or liquid level in the container based on the sensed information.

In another embodiment, liquid level in the container (e.g., container 100-100V) is measured based on sensed temperature (or information indicative of temperature) from a temperature sensor S3. In one embodiment, the sensor S3 can sense how long it takes the temperature to increase a reference number of degrees (e.g., 1 degree F. or 1 degree C.) when the chamber of the container is full of liquid to provide a first reference time, and the first reference time can be stored in a memory (e.g., a memory of the electronic module EM). Optionally, additional reference times can be provided by the sensor S3 when the chamber of the container has other volumes of liquid therein (e.g., half full, ¾ full) and the reference times stored in said memory. During operation of the container, the temperature sensor S3 can measure how long it takes for the temperature in the chamber to change by said reference number of degrees and communicate the sensed time information to the electronic module EM, which can provide a measurement of liquid volume or liquid level in the container based on the sensed time information, for example, based on an algorithm correlating time versus liquid volume or level. In one embodiment, the sensed time information is compared against one or more of the reference times and the liquid level or volume interpolated between the level or volume values corresponding to the reference times. Optionally, the algorithm can calculate the liquid volume or level based at least in part on sensed ambient temperature (e.g., from a sensor S4), to account for variations in how long it takes the temperature to increases by the reference number of degrees depending on ambient temperature (e.g., at high altitude, low altitude, in winter, in summer, etc.). Use of the temperature sensor S3 therefore advantageously allows measurement of temperature and liquid level in the container with one sensor instead of requiring a separate sensor to measure liquid level, which provides for a simpler and less costly system.

While certain embodiments of the inventions have been described, these embodiments have been presented by way of example only, and are not intended to limit the scope of the disclosure. Indeed, the novel methods and systems described herein may be embodied in a variety of other forms. For example, though the features disclosed herein are in describe for drinkware containers, the features are applicable to containers that are not drinkware containers (e.g., dishware, such as plates and bowls, serverware such as serving dishes and hot plates, food storage containers such as tortilla warmers, bread baskets) and the invention is understood to extend to such other containers. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel"

refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. An actively heated or cooled drinkware container system, comprising:
   a body having a chamber configured to receive and hold a liquid, one or more heating or cooling elements disposed in the body and in thermal communication with at least a portion of the chamber, a distal outer surface of the body having one or more electrical contacts, one or more sensors disposed in the body;
   a module configured to removably couple to a bottom portion of the body to thereby contact at least a portion of the body and provide a mechanical and an electrical connection with the body when the body is placed on top of the module, allowing the body with the attached module to be portable as a single unit, the module comprising
      one or more electrical contacts on a proximal outer surface of the module configured to provide an electrical connection with the one or more electrical contacts of the body when the body is placed on top of the module, and
      one or more power storage elements selectively connectable to the one or more heating or cooling elements; and
   control circuitry operable to control the operation of the one or more heating or cooling elements to control an amount of energy supplied to the liquid in the chamber to maintain or increase the temperature of the liquid to a temperature setpoint,
   wherein when the body is placed on top of the module, the one or more heating or cooling elements and one or more sensors are powered by the one or more power storage elements via at least one of the one or more electrical contacts in the body and the module, and wherein mechanically detaching the module from the body disconnects the one or more heating or cooling elements and one or more sensors from the one or more power storage elements.

2. The container of claim 1, wherein the control circuitry is housed in the module and when the body is attached to the module one or more sensors in the body that sense one or more parameters of the liquid in the chamber are configured to communicate with the control circuitry via at least one of the one or more electrical contacts in the body and the module, and wherein detaching the body from the module disconnects the control circuitry from the one or more sensors.

3. The container of claim 2, wherein the one or more sensors includes a temperature sensor operable to sense a temperature of the liquid in the chamber.

4. The container of claim 1, wherein the one or more electrical contacts on one of the body and the module include one or more pins and wherein the one or more electrical contacts on the other of the body and the module include one or more circular rings, allowing coupling of the body and the module irrespective of an orientation of the body and the module.

5. The container of claim 1, wherein the module is configured to provide a mechanical connection with the body at least in part via at least one magnet in the body and at least one magnet in the module.

6. The container of claim 1, wherein the control circuitry is configured to wirelessly communicate with an electronic device, the control circuitry configured to control power delivery to the one or more heating or cooling elements when the body is placed on top of the module to adjust a temperature of the liquid in the chamber toward a user selected temperature.

7. An actively heated or cooled drinkware container system, comprising:
   a body having a chamber configured to receive and hold a liquid, one or more heating or cooling elements disposed in the body and in thermal communication with at least a portion of the chamber, an outer surface of the body having one or more electrical contacts, and one or more sensors disposed in the body;
   a module configured to removably couple to a bottom portion of the body to thereby contact at least a portion of the body and provide a mechanical and an electrical connection with the body when the body is placed on top of the module, allowing the body with the attached module to be portable as a single unit, the module comprising one or more power storage elements selectively connectable with the one or more heating or cooling elements when the body is placed on top of the module, the module having one or more electrical contacts configured to at least partially electrically couple the module and the body when the body is placed on top of the module;
   one or more magnets in one or both of the module and the body configured to at least partially mechanically couple the module and the body; and
   control circuitry operable to control the operation of the one or more heating or cooling elements to control an amount of energy supplied to the liquid in the chamber to maintain or increase the temperature of the liquid to a temperature setpoint, wherein when the body is placed on top of the module, the one or more heating or cooling elements and one or more sensors are powered by the one or more power storage elements via at least one of the one or more electrical contacts in the body and the module, and wherein mechanically detaching the module from the body disconnects the one or more heating or cooling elements and one or more sensors from the one or more power storage elements.

8. The container of claim 7, wherein the one or more electrical contacts on one of the body and the module include one or more pins and wherein the one or more electrical contacts on the other of the body and the module include one or more circular rings, allowing coupling of the body and the module irrespective of an orientation of the body and the module.

9. The container of claim 7, wherein the control circuitry is housed in the module and when the body is placed on top of to the module the one or more sensors are configured to communicate with the control circuitry via one or more electrical contacts in the body and the module, and wherein detaching the body from the module disconnects the control circuitry from the one or more sensors.

10. The container of claim 7, wherein the one or more sensors includes a temperature sensor operable to sense a temperature of the liquid in the chamber.

11. The container of claim 7, wherein the one or more magnets include at least one magnet in the body and at least one magnet in the module.

12. The container of claim 7, wherein the control circuitry is configured to wirelessly communicate with an electronic device, the control circuitry configured to control power delivery to the one or more heating or cooling elements when the module is coupled to the body to adjust a temperature of the liquid in the chamber toward a user selected temperature.

13. An actively heated or cooled drinkware container system, comprising:
- a body having a chamber configured to receive and hold a liquid, one or more heating or cooling elements disposed in the body and in thermal communication with at least a portion of the chamber, and one or more sensors disposed in the body;
- a module configured to removably couple to a bottom portion of the body to thereby contact at least a portion of the body and provide a mechanical and an electrical connection with the body when the body is placed on top of the module, allowing the body with the attached module to be portable as a single unit, the module comprising one or more power storage elements selectively connectable to the one or more heating or cooling elements and configured to provide power from the one or power storage elements to the one or more heating or cooling elements when the body is placed on top of the module; and
- control circuitry operable to control the operation of the one or more heating or cooling elements to control an amount of energy supplied to the liquid in the chamber to maintain or increase the temperature of the liquid to a user selected temperature setpoint, wherein when the body is placed on top of the module, the one or more heating or cooling elements and one or more sensors are powered by the one or more power storage elements, and wherein mechanically detaching the module from the body disconnects the one or more heating or cooling elements and one or more sensors from the one or more power storage elements.

14. the container of claim 13, further comprising one or more magnets in one or both of the module and the body configured to at least partially mechanically couple the module and the body.

15. The container of claim 14, wherein the one or more magnets include at least one magnet in the body and at least one magnet in the module.

16. The container of claim 13, wherein the body has a distal outer surface having one or more electrical contacts, and the module has one or more electrical contacts on a proximal outer surface of the module configured to provide an electrical connection with the one or more electrical contacts of the body when the body is placed on top of the module.

17. The container of claim 16, wherein the control circuitry is housed in the module and when the body is placed on top of the module the one or more sensors are configured to communicate with the control circuitry via one or more electrical contacts in the body and the module, wherein the one or more heating or cooling elements are configured to receive power from the one or more power storage elements via at least one of the one or more electrical contacts in the body and the module, and wherein detaching the body from the module disconnects the control circuitry from the one or more sensors and disconnects the one or more heating or cooling elements from the one or more power storage elements.

18. The container of claim 13, wherein the one or more sensors includes a temperature sensor operable to sense a temperature of the liquid in the chamber.

19. The container of claim 13, wherein the control circuitry is configured to wirelessly receive a user selected temperature, the control circuitry configured to control power delivery to the one or more heating or cooling elements when the module is coupled to the body to adjust a temperature of the liquid in the chamber toward the user selected temperature.

* * * * *